(12) United States Patent
Kobayashi et al.

(10) Patent No.: US 7,920,500 B2
(45) Date of Patent: Apr. 5, 2011

(54) CONTROLLER APPARATUS, MOBILE TERMINAL, AND COMMUNICATION CONTROL METHOD

(75) Inventors: Motonari Kobayashi, Yokohama (JP);
Toshihiro Suzuki, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 815 days.

(21) Appl. No.: 11/312,508

(22) Filed: Dec. 21, 2005

(65) Prior Publication Data

US 2006/0159054 A1 Jul. 20, 2006

(30) Foreign Application Priority Data

Dec. 21, 2004 (JP) ................ P2004-370210

(51) Int. Cl.
*H04B 7/14* (2006.01)
*H04J 3/08* (2006.01)
*H04B 7/185* (2006.01)

(52) U.S. Cl. .............. 370/315; 370/328; 455/13.1

(58) Field of Classification Search ............ 370/348, 370/346, 315, 328
See application file for complete search history.

(56) References Cited

U.S. PATENT DOCUMENTS

| | | | |
|---|---|---|---|
| 2003/0026208 A1* | 2/2003 | Bijwaard et al. | 370/236 |
| 2003/0235174 A1 | 12/2003 | Pichna et al. | |
| 2004/0127214 A1 | 7/2004 | Reddy et al. | |
| 2004/0233855 A1* | 11/2004 | Gutierrez et al. | 370/252 |
| 2006/0239203 A1* | 10/2006 | Talpade et al. | 370/252 |
| 2008/0205308 A1* | 8/2008 | Prehofer et al. | 370/310 |

FOREIGN PATENT DOCUMENTS

| | | |
|---|---|---|
| DE | 10309108 | 9/2004 |
| JP | 9-270822 | 10/1997 |
| JP | 2002-189623 | 7/2002 |

OTHER PUBLICATIONS

Hop count optimal position based packet routing algorithms for ad hoc wireless networks with a realistic physical layer; 2004 IEEE International Conterence on Mobile Ad-hoc and Sensor System, pp. 398-405.

* cited by examiner

*Primary Examiner* — Nick Corsaro
*Assistant Examiner* — Huy C Ho
(74) *Attorney, Agent, or Firm* — Oblon, Spivak, McClelland, Maier & Neustadt, L.L.P.

(57) ABSTRACT

A controller apparatus of this invention controls transmission of a packet from a source mobile terminal to a destination mobile terminal through one or more relay mobile terminals in an ad hoc network formed by a plurality of mobile terminals. The controller apparatus includes a packet location information managing unit configured to manage packet location information which shows to which mobile terminal the packet has been transmitted in the ad hoc network.

8 Claims, 16 Drawing Sheets

FIG. 4

| PACKET ID | CURRENT LOCATION | SOURCE | DESTINATION |
|---|---|---|---|
| #1 | MT#13 | MT#11 | MT#21 |
| #2 | MT#12 | MT#11 | MT#13 |
| ⋮ | ⋮ | ⋮ | ⋮ |
| #n | MT#21 | MT#12 | MT#22 |
| ⋮ | ⋮ | ⋮ | ⋮ |

US 7,920,500 B2

CONTROLLER APPARATUS, MOBILE TERMINAL, AND COMMUNICATION CONTROL METHOD

CROSS REFERENCE TO RELATED APPLICATION

This application is based upon and claims the benefit of priority from the prior Japanese Patent Application No. P2004-370210, filed on Dec. 21, 2004; the entire contents of which are incorporated herein by reference.

BACKGROUND OF THE INVENTION

1. Field of the Invention

The present invention relates to a communication control method, a controller apparatus and a mobile terminal for controlling transmission of packets from a source mobile terminal to a destination mobile terminal through one or more relay mobile terminals in an ad hoc network formed by a plurality of mobile terminals.

2. Description of the Related Art

An ad hoc network formed by the configuration of a number of mobile terminals connected to each other without any access points therebetween, using a wireless technology such as IEEE 802.11x or Bluetooth (registered trademark), has been known.

In such an ad hoc network, packets are transmitted from a source mobile terminal to a destination mobile terminal through one or more relay mobile terminals.

Specifically, each of the mobile terminals forming the ad hoc network forwards a packet received from a forwarding source mobile terminal to a forwarding destination mobile terminal, whereby the packet from the source mobile terminal reaches the destination mobile terminal.

A conventional ad hoc network, however, is an autonomous network, and does not include a mechanism for controlling transmission of packets in the ad hoc network.

Also, in a large-scale ad hoc network, a packet is relayed through a number of mobile terminals before reaching a destination mobile terminal, resulting in a large delay time.

Consequently, the conventional ad hoc network has the problem that, when the scale of the network becomes large, a method of determining arrival of packets and a method of determining loss of packets during transmission, using ACK, such as TCP, cannot be used.

BRIEF SUMMARY OF THE INVENTION

The present invention has been made in view of the above problems, and has an object of providing a communication control method which can provide a mechanism for controlling transmission of packets in an ad hoc network, thereby implementing a reliable ad hoc network, and a controller apparatus and a mobile terminal used in the communication control method.

A first aspect of the present invention is summarized as a controller apparatus configured to control transmission of a packet from a source mobile terminal to a destination mobile terminal through one or more relay mobile terminals in an ad hoc network formed by a plurality of mobile terminals, the controller apparatus including: a packet location information managing unit configured to manage packet location information showing to which mobile terminal the packet has been transmitted in the ad hoc network.

In the first aspect of the present invention, the controller apparatus can further include a completion report acquiring unit configured to acquire, from the relay mobile terminals, a completion report showing completion of forwarding of the packet; and the packet location information managing unit can be configured to update the packet location information according to the completion report.

In the first aspect of the present invention, the controller apparatus can further include a checking unit configured to check with the relay mobile terminals whether the relay mobile terminals hold the packet or not; and the packet location information managing unit can be configured to update the packet location information based on a result of the checking.

In the first aspect of the present invention, the controller apparatus can further include: a detecting unit configured to detect loss of the packet in the ad hoc network; and a retransmission request transmitting unit configured to transmit a retransmission request for the lost packet to a certain mobile terminal.

In the first aspect of the present invention, the controller apparatus can further include a checking unit configured to check with the relay mobile terminals whether the relay mobile terminals hold the packet or not; and the retransmission request transmitting unit can be configured to transmit the retransmission request to a relay mobile terminal holding the packet, based on a result of the checking.

In the first aspect of the present invention, the controller apparatus can further include: a communication environment information acquiring unit configured to acquire, from the mobile terminals, communication environment information showing a communication environment at the mobile terminals; and a proxy control information transmitting unit configured to transmit proxy control information for performing transmission control of the packet in place of the controller apparatus, to a certain mobile terminal belonging to the ad hoc network when the acquired communication environment information satisfies a predetermined condition.

A second aspect of the present invention is summarized as a mobile terminal configured to forward a packet transmitted from a source mobile terminal to a destination mobile terminal in an ad hoc network formed by a plurality of mobile terminals, from a forwarding source mobile terminal to a forwarding destination mobile terminal, the mobile terminal including: a completion report transmitting unit configured to transmit a completion report showing completion of forwarding of the packet, to a certain controller apparatus configured to control transmission of a packet in the ad hoc network.

In the second aspect of the present invention, the completion report transmitting unit can be configured to transmit the completion report to the certain controller apparatus when reception of the packet transmitted from the forwarding source mobile terminal is completed.

In the second aspect of the present invention, the completion report transmitting unit can be configured to transmit the completion report to the certain controller apparatus when transmission of the packet to the forwarding destination mobile terminal is completed.

A third aspect of the present invention is summarized as a mobile terminal configured to forward a packet transmitted from a source mobile terminal to a destination mobile terminal in an ad hoc network formed by a plurality of mobile terminals, from a forwarding source mobile terminal to a forwarding destination mobile terminal, the mobile terminal including: a 10 checking result transmitting unit configured to transmit a result of checking whether the mobile terminal holds the packet or not to a certain controller apparatus configured to control transmission of a packet in the ad hoc network when asked by the certain controller apparatus.

In the third aspect of the present invention, the mobile terminal can further include: a storage unit configured to hold the packet received from the forwarding source mobile terminal; and a packet discarding unit configured to discard the packet held in the storage unit, according to a discard instruction of the packet received from the certain controller apparatus.

In the third aspect of the present invention, the mobile terminal can further include a packet transmitting unit configured to retransmit the packet held in the storage unit to the forwarding destination mobile terminal, in accordance with a retransmission request of the packet received from the certain controller apparatus.

A fourth aspect of the present invention is summarized as a communication control method for controlling transmission of a packet from a source mobile terminal to a destination mobile terminal through one or more relay mobile terminals in an ad hoc network formed by a plurality of mobile terminals, the method including: forwarding, at each of the relay mobile terminals, the packet received from a forwarding source mobile terminal to a forwarding destination mobile terminal; transmitting, at each of the relay mobile terminals, a completion report showing completion of forwarding of the packet to a certain controller apparatus configured to control transmission of the packet in the ad hoc network; and managing, at the certain controller apparatus, packet location information showing to which mobile terminal the packet has been transmitted in the ad hoc network, according to the completion report.

A fifth aspect of the present invention is summarized as a communication control method for controlling transmission of a packet from a source mobile terminal to a destination mobile terminal through one or more relay mobile terminals in an ad hoc network formed by a plurality of mobile terminals, the method including: forwarding, at each of the relay mobile terminals, the packet received from a forwarding source mobile terminal to a forwarding destination mobile terminal; checking, at a certain controller apparatus configured to control transmission of the packet in the ad hoc network, with each of the relay mobile terminals whether the relay mobile terminal holds the packet or not; transmitting, at each of the relay mobile terminals, a result of the checking to the certain controller apparatus; and managing, at the certain controller apparatus, packet location information showing to which mobile terminal the packet has been transmitted in the ad hoc network, according to the result of the checking.

BRIEF DESCRIPTION OF THE SEVERAL VIEWS OF THE DRAWINGS

FIG. 4 is a diagram showing an example of packet location information managed by a packet location information managing unit within the assist controller apparatus in the mobile communication system according to the first embodiment of the present invention;

DETAILED DESCRIPTION OF THE INVENTION

Figure 1:
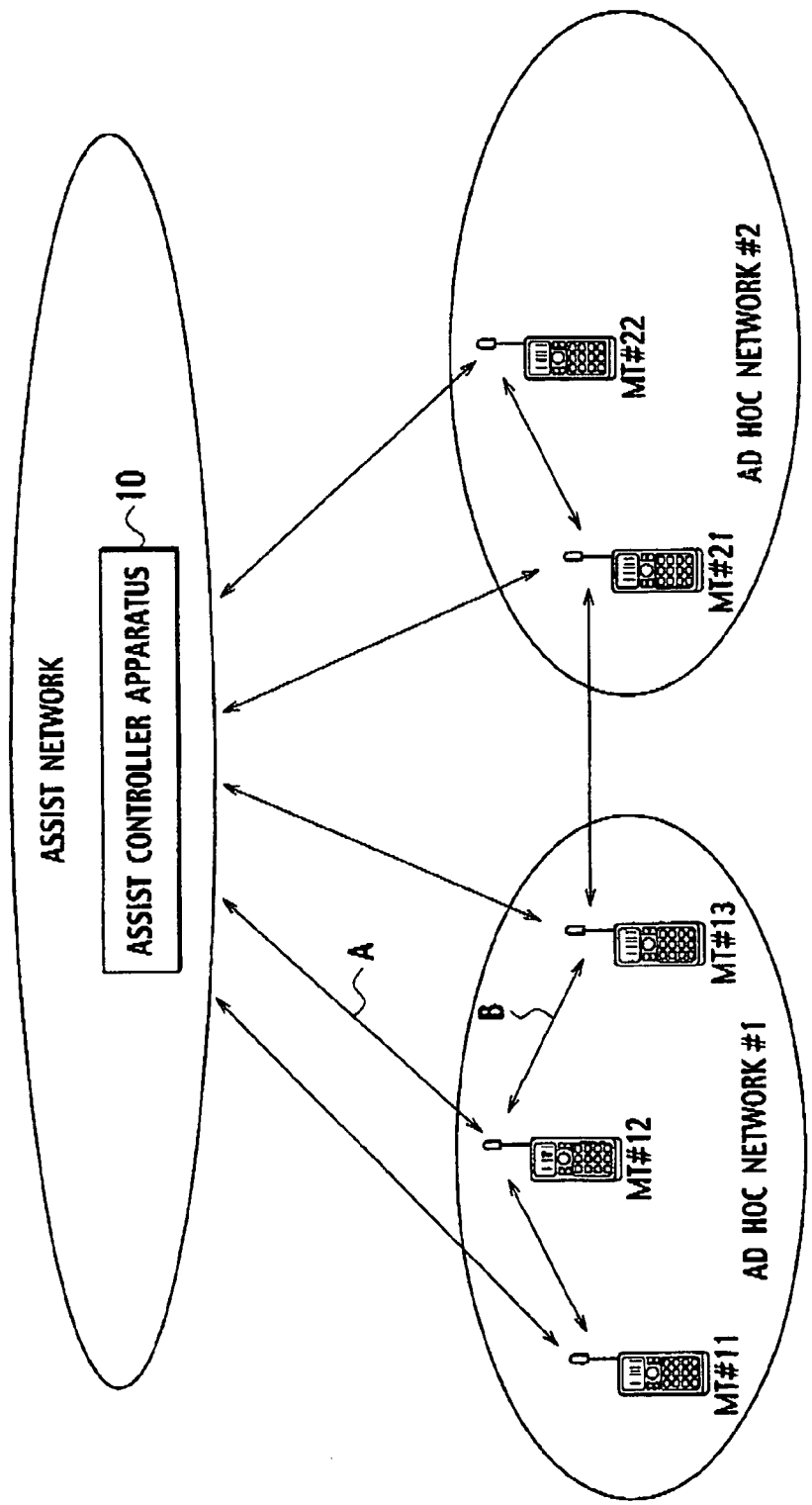
FIG. 1 is an overall configuration diagram of a mobile communication system according to a first embodiment of the present invention.

Configuration of Mobile Communication System in First Embodiment of the Invention With reference to FIGS. 1 to 4, the configuration of a mobile communication system according to a first embodiment of the present invention will be described. As shown in FIG. 1, the mobile communication system of this embodiment includes an assist controller apparatus 10 and a plurality of mobile terminals MT#11 to MT#22.

The assist controller apparatus 10 is provided in an assist network constituted by a public mobile communication network, for example.

The mobile terminals MT#11 to MT#22 are configured to form ad hoc networks #1 and #2 by directly communicating with each other without using any public mobile communication network.

In the example of FIG. 1, the mobile terminals MT#11 to MT#13 form the ad hoc network #1, and the mobile terminals MT#21 and MT#22 form the ad hoc network #2.

Figure 2:
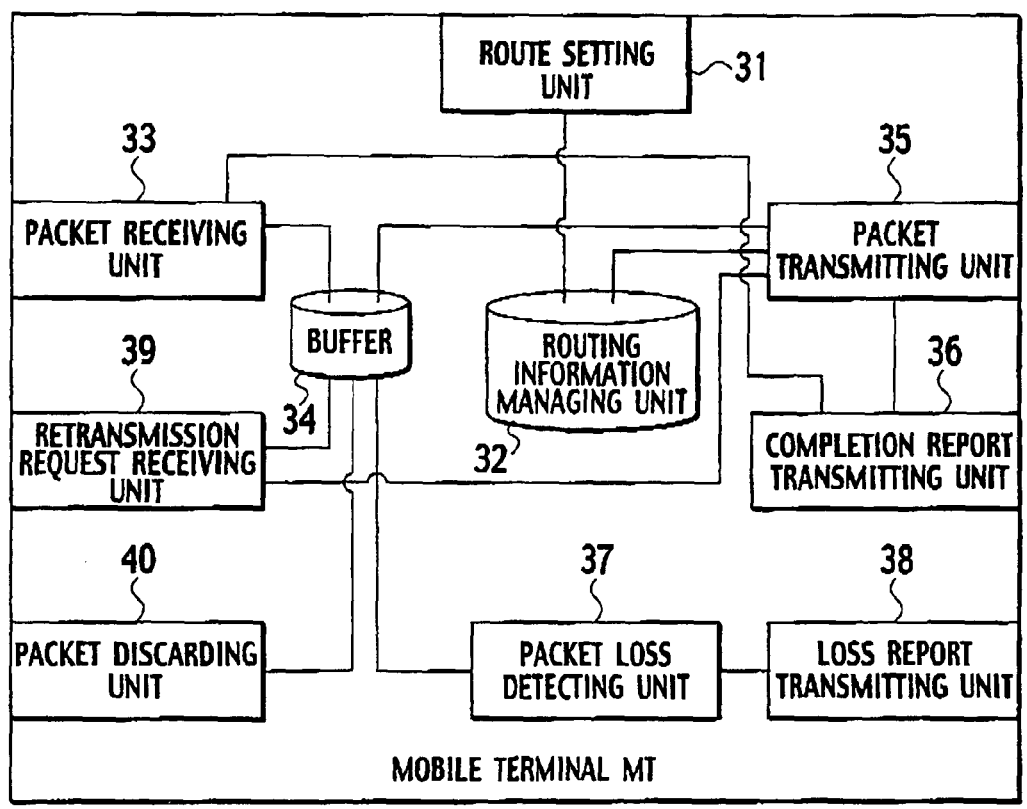
FIG. 2 is a functional block diagram of a mobile terminal in the mobile communication system according to the first embodiment of the present invention.

As shown in FIG. 2, a mobile terminals MT in this embodiment includes a route setting unit 31, a routing information managing unit 32, a packet receiving unit 33, a buffer 34, a packet transmitting unit 35, a completion report transmitting unit 36, a packet loss detecting unit 37, a loss report transmitting unit 38, a retransmission request receiving unit 39, and a packet discarding unit 40.

The route setting unit 31 is configured to set a packet transmission route for transmitting a packet addressed to a destination mobile terminal in a desired manner.

For example, the route setting unit 31 may be configured to set a packet transmission route to a destination mobile terminal in advance, based on GPS information, base station information, access point information, or the like.

When a packet autonomously determines a forwarding destination mobile terminal, the route setting unit 31 may be configured to set a packet transmission route to the destination mobile terminal, based on the determination of the forwarding destination mobile terminal by the packet.

The routing information managing unit 32 is configured to manage routing information on a packet transmission route set by the route setting unit 31.

The packet receiving unit 33 is configured to receive a packet transmitted from a forwarding source mobile terminal, and to store the received packet in the buffer 34.

The buffer 34 is configured to hold packets received by the packet receiving unit 33.

A packet held in the buffer 34 may be deleted when it is transmitted to a forwarding destination mobile terminal by the packet transmitting unit 35, or may be deleted when there is an instruction from the packet discarding unit 40, or may be deleted by a time-out or the like by TCP or the like. That is, packets held in the buffer 34 continue to be held untie a certain trigger as described above occurs.

The packet transmitting unit 35 is configured to extract a packet from the buffer 34 at a given timing and to transmit the extracted packet to a forwarding destination mobile terminal, based on routing information managed by the routing information managing unit 32.

Also, according to an instruction from the retransmission request receiving unit 39, the packet transmitting unit 35 is configured to retransmit an appropriate packet held in the buffer 34 to a forwarding destination mobile terminal.

The completion report transmitting unit 36 is configured to transmit a completion report showing completion of transmission of a packet, to the assist controller apparatus 10 (a certain controller apparatus) configured to control transmission of packets in the ad hoc network.

When the packet receiving unit 33 completes reception of a packet transmitted from a forwarding source mobile terminal, the completion report transmitting unit 36 may be configured to transmit a completion report described above to the assist controller apparatus 10.

A completion report in this case shows that transmission of a packet from a forwarding source mobile terminal to the mobile terminal has been completed.

Also, when the packet transmitting unit 35 completes transmission of a packet to a forwarding destination mobile terminal, the completion report transmitting unit 36 may be configured to transmit a completion report described above to the assist controller apparatus 10.

A completion report in this case shows that transmission of a packet from the mobile terminal to a forwarding destination mobile terminal has been completed.

A completion report includes a packet ID for uniquely identifying a packet whose transmission has been completed, identification information on the mobile terminal, information showing whether the mobile terminal is a forwarding source mobile terminal or a forwarding destination mobile terminal.

The packet loss detecting unit 37 is configured to detect the loss of a packet during transmission. For example, the packet loss detecting unit 37 is configured to detect the loss of a packet which was held in the buffer 34, the loss of a packet in a link with a forwarding destination mobile terminal, or the like.

The loss of a packet occurs when it is deleted by a user of the mobile terminal by mistake, or when the power to the mobile terminal turns off, for example.

The loss report transmitting unit 38 is configured to transmit, to the assist controller apparatus 10, a loss report for reporting the loss of a packet detected by the packet loss detecting unit 37.

The loss report includes a packet ID for uniquely identifying the packet, identification information on the mobile terminal, and information for specifying where the packet was lost (e.g., in the buffer or link).

The retransmission request receiving unit 39 is configured to instruct the packet transmitting unit 35 to retransmit an appropriate packet held in the buffer 34 to a forwarding destination mobile terminal, in accordance with a packet retransmission request received from the assist controller apparatus 10.

The packet discarding unit 40 is configured to discard an appropriate packet held in the buffer 34, in accordance with a packet discard instruction received from the assist controller apparatus 10.

The assist controller apparatus 10 is a controller apparatus configured to control transmission of a packet from a source mobile terminal (e.g., the mobile terminal MT#11) to a destination mobile terminal (e.g., the mobile terminal MT#22) through one or more relay mobile terminals (e.g., the mobile terminals MT#12, MT#13, MT#21) in an ad hoc network.

Figure 3:
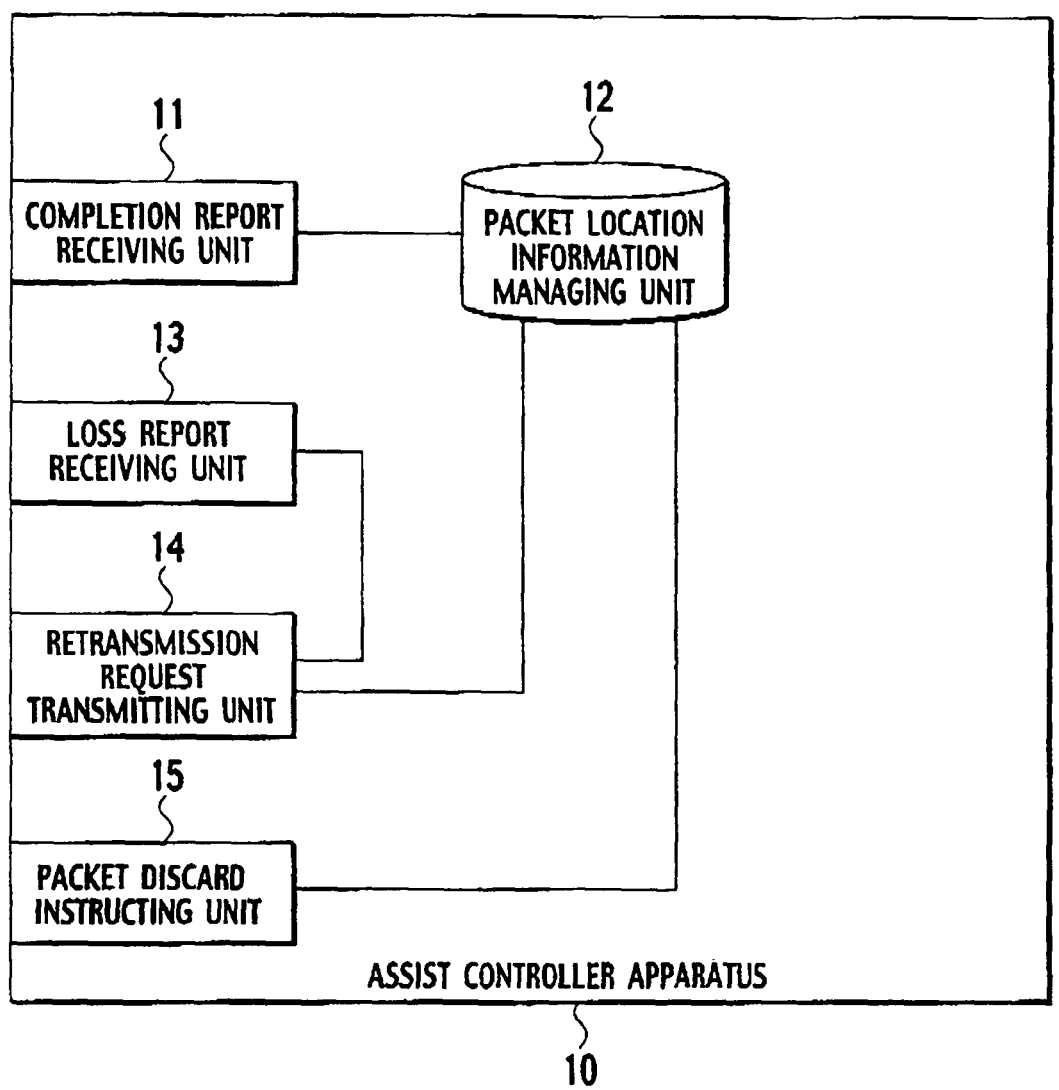
FIG. 3 is a functional block diagram of an assist controller apparatus in the mobile communication system according to the first embodiment of the present invention.

Specifically, as shown in FIG. 3, the assist controller apparatus 10 includes a completion report receiving unit 11, a packet location information managing unit 12, a loss report receiving unit 13, a retransmission request transmitting unit 14, and a packet discard instructing unit 15.

The completion report receiving unit 11 is configured to acquire a completion report showing completion of forwarding of a packet from a relay mobile terminal located on a packet transmission route for the packet transmitted from a source mobile terminal to a destination mobile terminal.

The completion report receiving unit 11 may be configured to receive a completion report from a forwarding source mobile terminal which has completed transmission of a packet, or may be configured to receive a completion report from a forwarding destination mobile terminal which has completed reception of a packet.

The packet location information managing unit 12 is configured to manage packet location information showing to which mobile terminal a packet has been transmitted in an ad hoc network.

As shown in FIG. 4, for example, the packet location information managing unit 12 is configured to manage packet location information in which a "packet ID", a "current location", a "source" and a "destination" are associated.

The "packet ID" is identification information for uniquely identifying a packet transmitted in an ad hoc network. The "current location" is identification information on a mobile terminal, showing to which mobile terminal the packet has been transmitted. The "source" is identification information on a source mobile terminal which transmitted the packet. The "destination" is identification information on a destination mobile terminal which is the destination of the packet.

In the example of FIG. 4, a packet of "packet ID=#1" is a packet transmitted from the source mobile terminal MT#11 to the destination mobile terminal MT#21, and has currently been transmitted to the relay mobile terminal MT#13.

The packet location information managing unit 12 is configured to update packet location information, according to a completion report transmitted from a relay mobile terminal.

The loss report receiving unit 13 is configured to receive a loss report from a relay mobile terminal, thereby detecting the loss of a packet in an ad hoc network.

The retransmission request transmitting unit 14 is configured to transmit a retransmission request for a lost packet to a certain mobile terminal.

Specifically, when a loss report is received by the loss report receiving unit 13, the retransmission request transmitting unit 14 is configured to transmit a retransmission request according to the loss report.

Here, the retransmission request transmitting unit 14 may be configured to transmit a retransmission request to a source mobile terminal of a lost packet.

Alternatively, the retransmission request transmitting unit 14 may be configured to transmit a retransmission request to a relay mobile terminal managed as the current location of the packet, based on packet location information managed by the packet location information managing unit 12.

Alternatively, the retransmission request transmitting unit 14 may be configured to check with each relay mobile terminal whether it holds a lost packet or not, and, based on a result of the checking, to transmit a retransmission request to a relay mobile terminal which holds the packet.

The packet discard instructing unit 15 is configured to discard a certain packet held in a buffer of a certain mobile terminal.

For example, when a completion report is received from a relay mobile terminal, the packet discard instructing unit 15 is configured to transmit a packet discard instruction for instructing discard of a packet related to the completion report to a mobile terminal which holds the packet.

Operation of the Mobile Communication System in the First Embodiment of the Invention With reference to FIGS. 5 to 10, operation of the mobile communication system according to the first embodiment of the present invention will be described.

Figure 5:
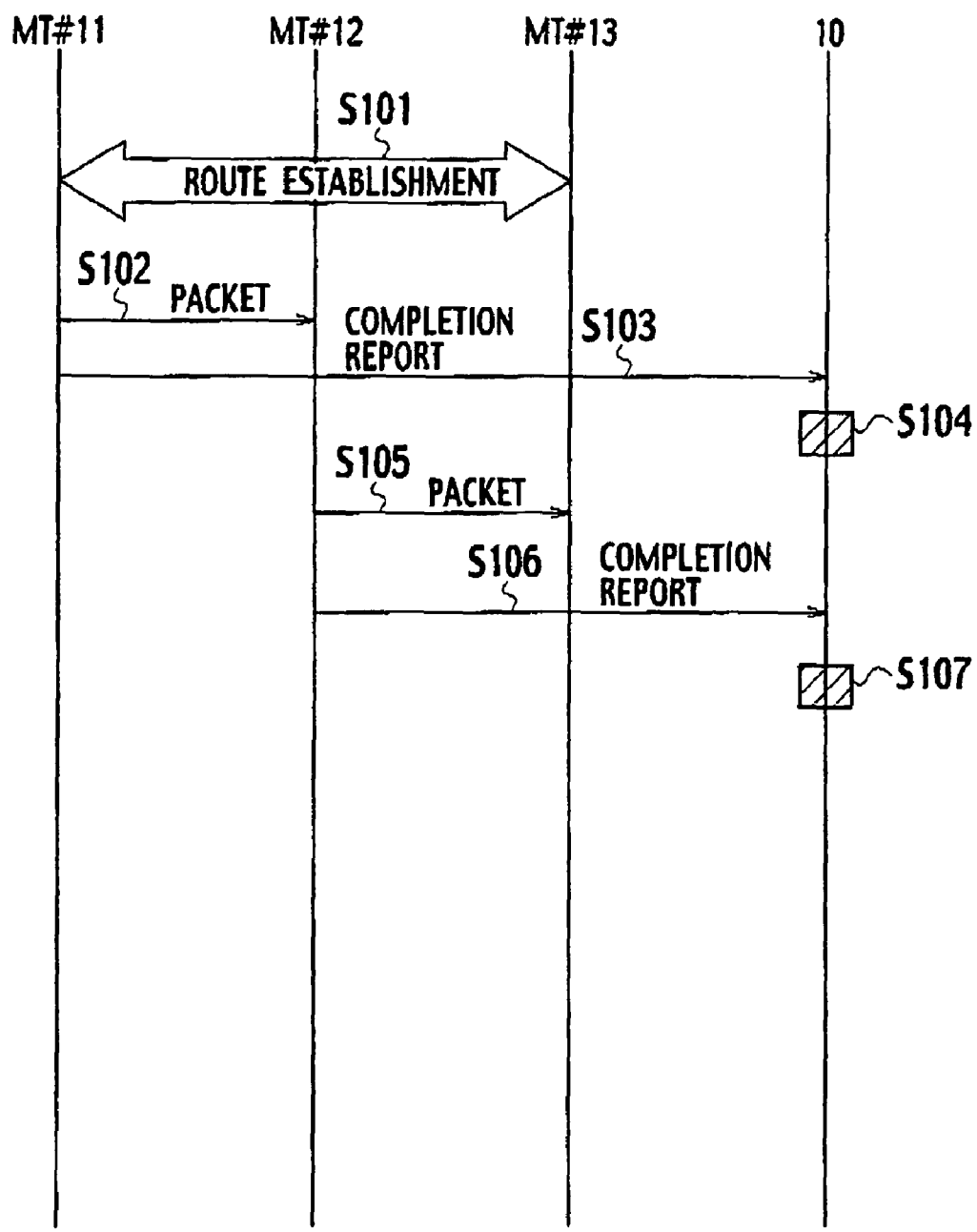
FIG. 5 is a sequence diagram showing an example of operation of transmitting a packet in the mobile communication system according to the first embodiment of the present invention.

First, with reference to FIG. 5, an example of operation of transmitting a packet from the source mobile terminal MT#11 to the destination mobile terminal MT#13 will be described.

In step S101, the route setting unit 31 of the source mobile terminal MT#11 establishes a packet transmission route with the destination mobile terminal MT#13 through the relay mobile terminal MT#12, and stores routing information on the packet transmission route in the routing information managing unit 32.

In step S102, the packet transmitting unit 35 of the source mobile terminal MT#11 generates a packet addressed to the destination mobile terminal MT#13 and transmits the packet to the relay mobile terminal MT#12.

In step S103, the completion report transmitting unit 36 of the source mobile terminal MT#11 transmits, to the assist controller apparatus 10, a completion report showing completion of transmission of the packet from the source mobile terminal MT#11 to the relay mobile terminal MT#12.

In step S104, the packet location information managing unit 12 of the assist controller apparatus 10 updates packet location information on the packet, based on the completion report received by the completion report receiving unit 11.

That is, the packet location information managing unit 12 makes the packet location information on the packet reflect the fact that the packet has currently been transmitted to the relay mobile terminal MT#12.

In step S105, the packet transmitting unit 35 of the relay mobile terminal MT#12 transmits the packet transmitted from the forwarding source mobile terminal (source mobile terminal) MT#11 to the forwarding destination mobile terminal (destination mobile terminal) MT#13.

In step S106, the completion report transmitting unit 36 of the relay mobile terminal MT#12 transmits, to the assist controller apparatus 10, a completion report showing completion of transmission of the packet from the relay mobile terminal MT#12 to the destination mobile terminal MT#13.

In step S107, the packet location information managing unit 12 of the assist controller apparatus 10 updates the packet location information on the packet, based on the completion report received by the completion report receiving unit 11.

That is, the packet location information managing unit 12 makes the packet location information on the packet reflect the fact that the packet has been transmitted to the destination mobile terminal MT#13.

Figure 6:
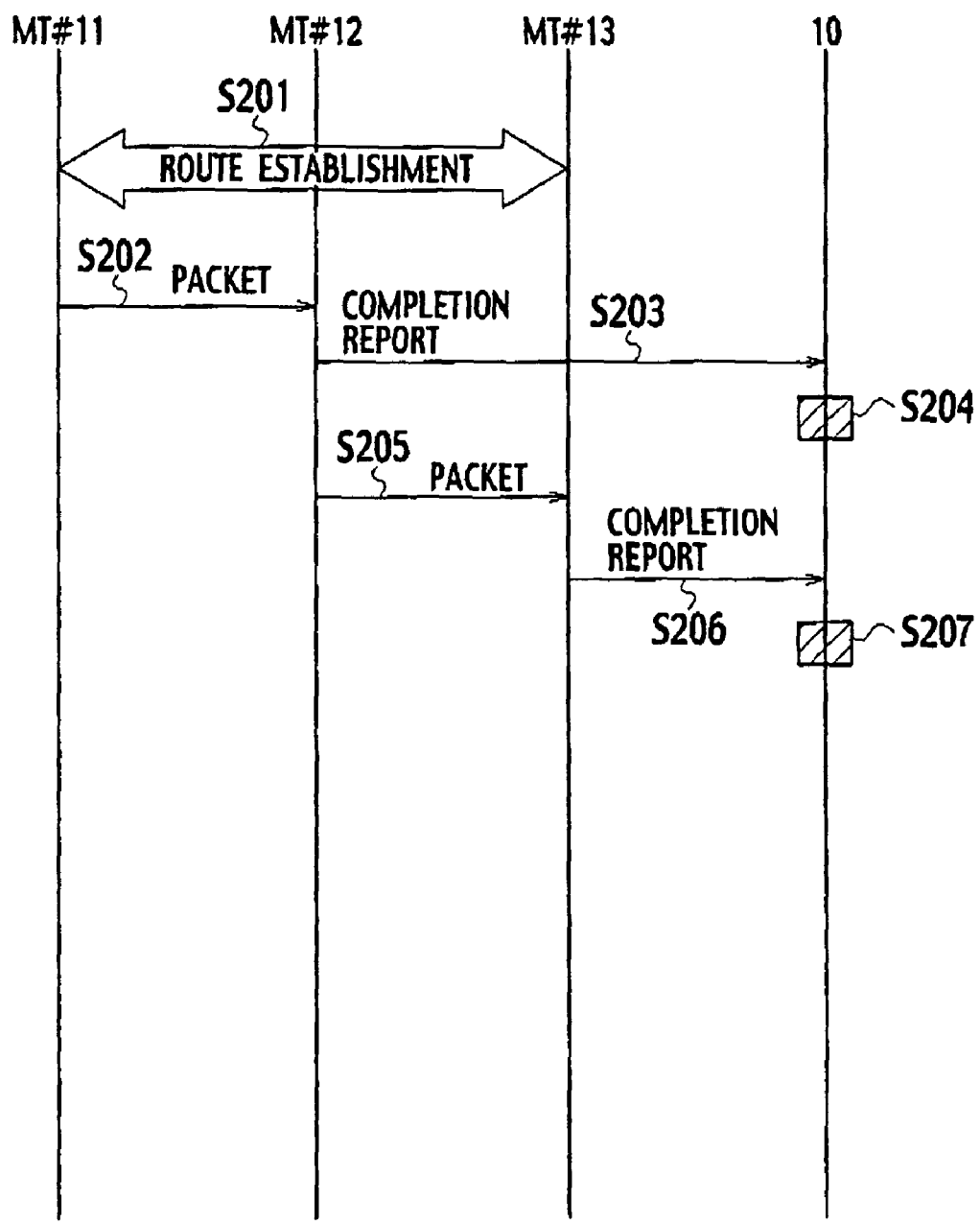
FIG. 6 is a sequence diagram showing an example of operation of transmitting a packet in the mobile communication system according to the first embodiment of the present invention.

Second, with reference to FIG. 6, an example of operation of transmitting a packet from the source mobile terminal MT#11 to the destination mobile terminal MT#13 will be described.

In step S201, the route setting unit 31 of the source mobile terminal MT#11 establishes a packet transmission route with the destination mobile terminal MT#13 through the relay mobile terminal MT#12, and stores routing information on the packet transmission route in the routing information managing unit 32.

In step S202, the packet transmitting unit 35 of the source mobile terminal MT#11 generates a packet addressed to the destination mobile terminal MT#13 and transmits the packet to the relay mobile terminal MT#12.

In step S203, the completion report transmitting unit 35 of the relay mobile terminal MT#12 transmits, to the assist controller apparatus 10, a completion report showing completion of transmission of the packet from the source mobile terminal MT#11 to the relay mobile terminal MT#12.

In step S204, the packet location information managing unit 12 of the assist controller apparatus 10 updates packet location information on the packet, based on the completion report received by the completion report receiving unit 11.

That is, the packet location information managing unit 12 makes the packet location information on the packet reflect the fact that the packet has currently been transmitted to the relay mobile terminal MT#12.

Instep S205, the packet transmitting unit 35 of the relay mobile terminal MT#12 transmits the packet transmitted from the forwarding source mobile terminal (source mobile terminal) MT#11 to the forwarding destination mobile terminal (destination mobile terminal) MT#13.

In step S206, the completion report transmitting unit 36 of the destination mobile terminal MT#13 transmits, to the assist controller apparatus 10, a completion report showing completion of transmission of the packet from the relay mobile terminal MT#12 to the destination mobile terminal MT#13.

In step S207, the packet location information managing unit 12 of the assist controller apparatus 10 updates the packet location information on the packet, based on the completion report received by the completion report receiving unit 11.

That is, the packet location information managing unit 12 makes the packet location information on the packet reflect the fact that the packet has been transmitted to the destination mobile terminal MT#13.

Figure 7:
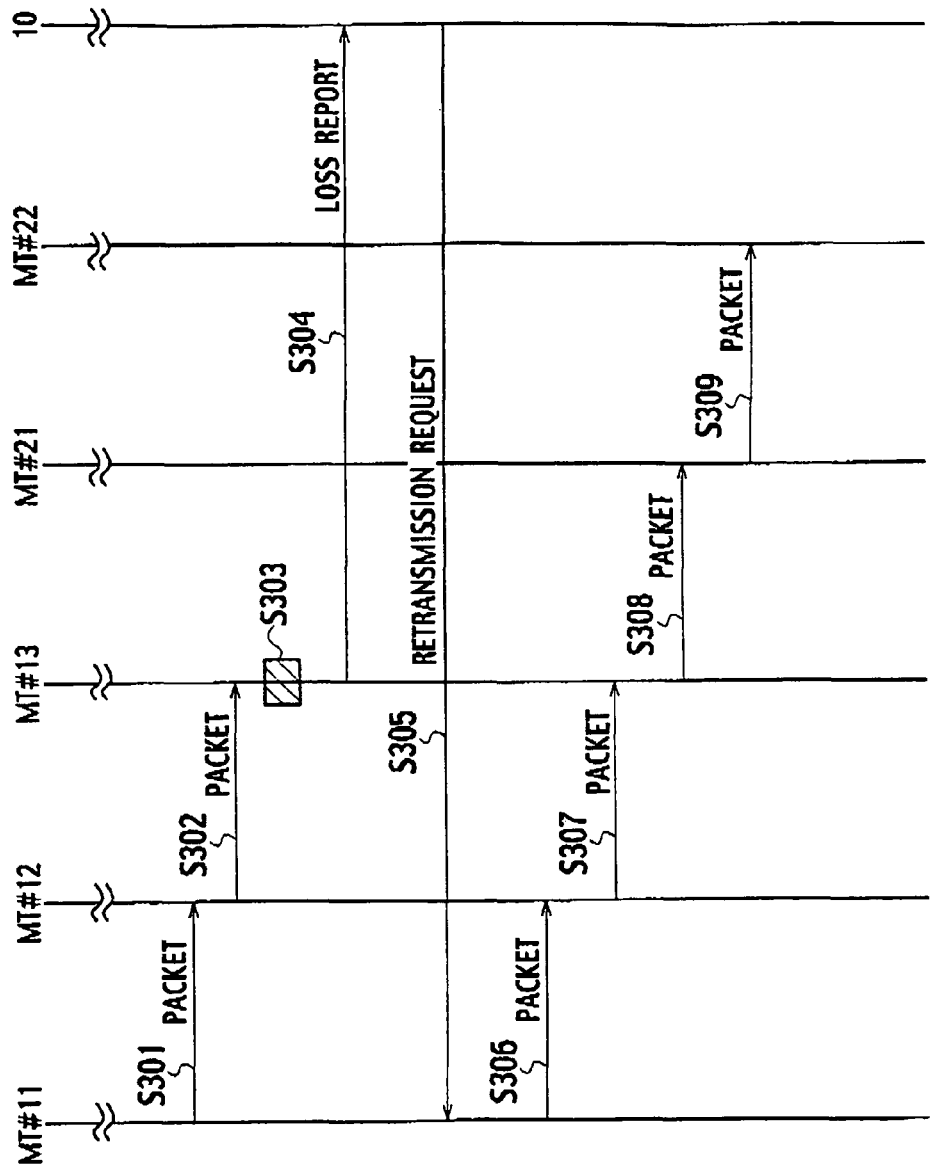
FIG. 7 is a sequence diagram showing an example of operation of retransmitting a packet in the mobile communication system according to the first embodiment of the present invention.

Third, with reference to FIG. 7, an example of operation of retransmitting a packet from the source mobile terminal MT#11 to the destination mobile terminal MT#22 will be described.

In step S301, the packet transmitting unit 35 of the source mobile terminal MT#11 generates a packet addressed to the destination mobile terminal MT#22 and transmits the packet to the relay mobile terminal MT#12; and the completion report transmitting unit 36 of the source mobile terminal MT#11 transmits, to the assist controller apparatus 10, a completion report showing completion of transmission of the packet.

In step S302, the packet receiving unit 33 of the relay mobile terminal MT#12 receives the packet transmitted from the source mobile terminal MT#11; the packet transmitting unit 35 of the relay mobile terminal MT#12 forwards the packet to the relay mobile terminal MT#13, based on routing information on the packet managed by the routing information managing unit 32; and the completion report transmitting unit 36 of the relay mobile terminal MT#21 transmits, to the assist controller apparatus 10, a completion report showing completion of forwarding of the packet.

In step S303, the packet loss detecting unit 37 of the relay mobile terminal MT#13 detects that the packet transmitted from the source mobile terminal MT#11 is lost in the buffer 34 of the relay mobile terminal MT#13 before forwarding to the relay mobile terminal MT#21.

In step S304, the loss report transmitting unit 38 of the relay mobile terminal MT#13 transmits a loss report showing the loss of the packet to the assist controller apparatus 10.

In step S305, the retransmission request transmitting unit 14 of the assist controller apparatus 10 transmits a retransmission request of the packet to the source mobile terminal MT#11 of the lost packet.

In step S306, the packet transmitting unit 35 of the source mobile terminal MT#11 retransmits the packet addressed to the destination mobile terminal MT#22 to the relay mobile terminal MT#12, in accordance with the retransmission request received by the retransmission request receiving unit 39.

In steps S307 to S309, the packet retransmitted by the source mobile terminal MT#11 is forwarded to the destination mobile terminal MT#22 through the relay mobile terminals MT#12, MT#13 and MT#21.

Figure 8:
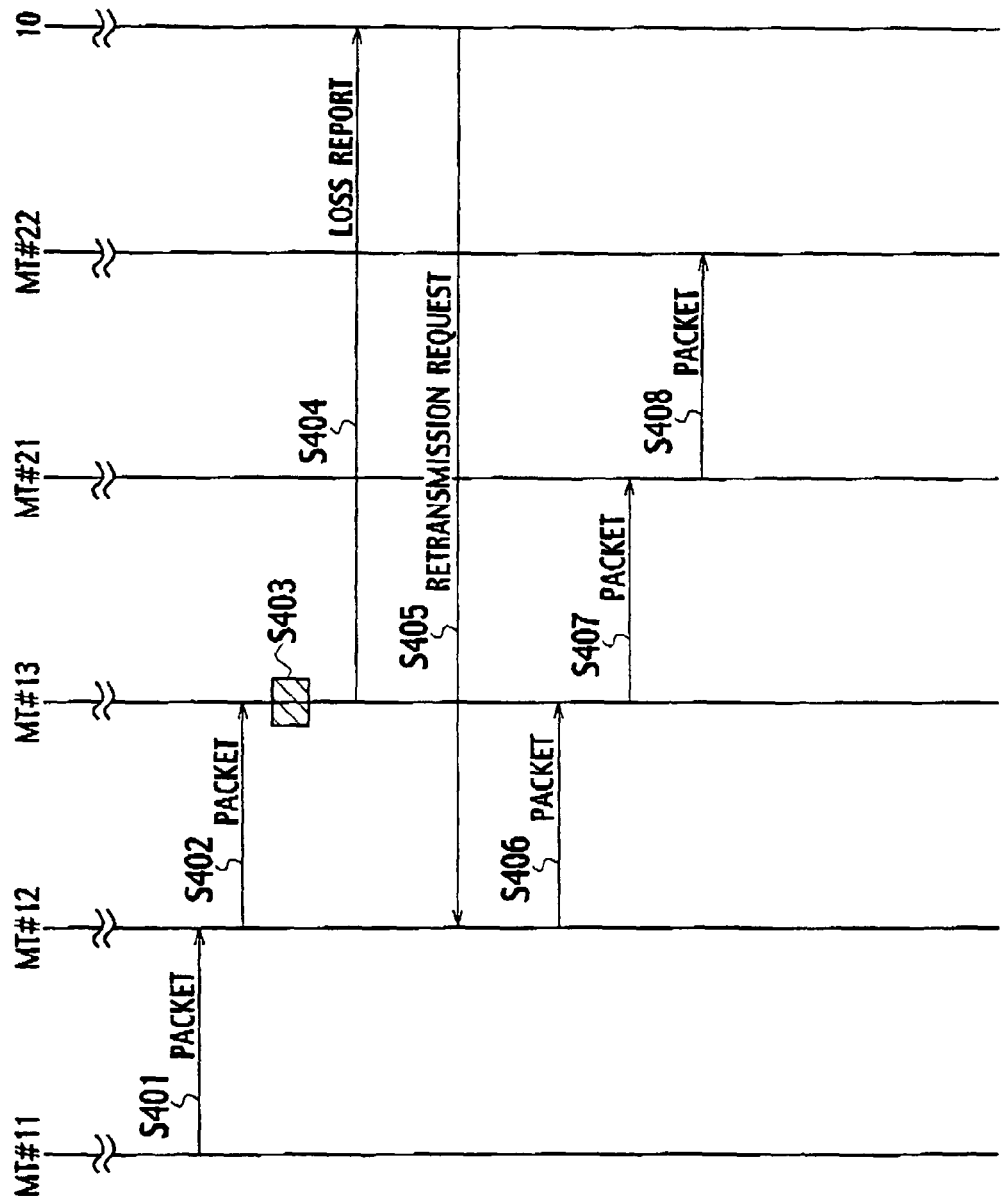
FIG. 8 is a sequence diagram showing an example of operation of retransmitting a packet in the mobile communication system according to the first embodiment of the present invention.

Fourth, with reference to FIG. 8, an example of operation of retransmitting a packet from the source mobile terminal MT#11 to the destination mobile terminal MT#22 will be described.

In step S401, the packet transmitting unit 35 of the source mobile terminal MT#11 generates a packet addressed to the destination mobile terminal MT#22 and transmits the packet to the relay mobile terminal MT#12; and the completion report transmitting unit 36 of the source mobile terminal MT#11 transmits, to the assist controller apparatus 10, a completion report showing completion of transmission of the packet.

In step S402, the packet receiving unit 33 of the relay mobile terminal MT#12 receives the packet transmitted from the source mobile terminal MT#11; the packet transmitting unit 35 of the relay mobile terminal MT#12 forwards the packet to, the relay mobile terminal MT#13, based on routing information on the packet managed by the routing information managing unit 32; and the completion report transmitting unit 36 of the relay mobile terminal MT#12 transmits, to the assist controller apparatus 10, a completion report showing completion of forwarding of the packet.

In step S403, the packet loss detecting unit 37 of the relay mobile terminal MT#13 detects that the packet transmitted from the forwarding source mobile terminal MT#12 is lost in the buffer 34 of the relay mobile terminal MT#13 before forwarding to the relay mobile terminal MT#21.

In step S404, the loss report transmitting unit 38 of the relay mobile terminal MT#13 transmits a loss report showing the loss of the packet to the assist controller apparatus 10.

In step S405, the retransmission request transmitting unit 14 of the assist controller apparatus 10 transmits a retransmission request of the packet to the relay mobile terminal MT#12 managed as the current location of the packet, based on packet location information managed by the packet location information managing unit 12.

In step S406, the packet transmitting unit 35 of the relay mobile terminal MT#12 retransmits, to the relay mobile terminal MT#13, the packet addressed to the destination mobile terminal 20 MT#22 held in the buffer 34, in accordance with the retransmission request received by the retransmission request receiving unit 39.

In steps S407 and S408, the packet retransmitted by the relay mobile terminal MT#12 is forwarded to the destination 25 mobile terminal MT#22 through the relay mobile terminals MT#13 and MT#21.

Figure 9:
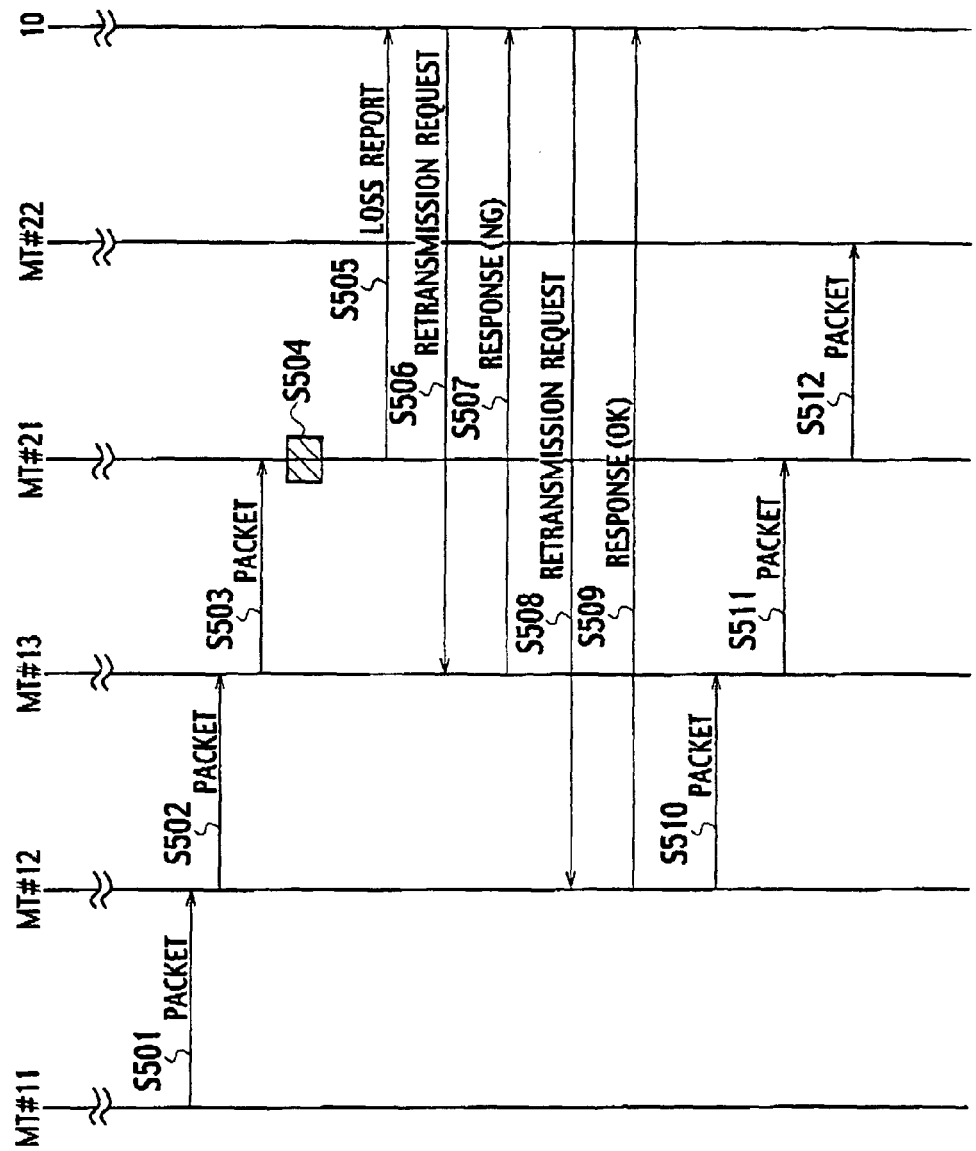
FIG. 9 is a sequence diagram showing an example of operation of retransmitting a packet in the mobile communication system according to the first embodiment of the present invention.

Fifth, with reference to FIG. 9, an example of operation of retransmitting a packet from the source mobile terminal MT#11 to the destination mobile terminal MT#22 will be described.

In step S501, the packet transmitting unit 35 of the source mobile terminal MT#11 generates a packet addressed to the destination mobile terminal MT#22 and transmits the packet to the relay mobile terminal MT#12; and the completion report transmitting unit 36 of the source mobile terminal MT#11 transmits, to the assist controller apparatus 10, a completion report showing completion of transmission of the packet.

In step S502, the packet receiving unit 33 of the relay mobile terminal MT#12 receives the packet transmitted from the source mobile terminal MT#11; the packet transmitting unit 35 of the relay mobile terminal MT#12 forwards the packet to the relay mobile terminal MT#13, based on routing information on the packet managed by the routing information managing unit 32; and the completion report transmitting unit 36 of the relay mobile terminal MT#12 transmits, to the assist controller apparatus 10, a completion report showing completion of forwarding of the packet.

In step S503, the packet receiving unit 33 of the relay mobile terminal MT#13 receives the packet transmitted from the forwarding source mobile terminal MT#12; the packet transmitting unit 35 of the relay mobile terminal MT#13 forwards the packet to the relay mobile terminal MT#21, based on routing information on the packet managed by the routing information managing unit 32; and the completion report transmitting unit 36 of the relay mobile terminal MT#13 transmits, to the assist controller apparatus 10, a completion report showing completion of forwarding of the packet.

In step S504, the packet loss detecting unit 37 of the relay mobile terminal MT#21 detects that the packet transmitted from the forwarding source mobile terminal MT#13 is lost in the buffer 34 of the relay mobile terminal MT#21 before forwarding to the destination mobile terminal MT#21.

In step S505, the loss report transmitting unit 38 of the relay mobile terminal MT#21 transmits a loss report showing the loss of the packet to the assist controller apparatus 10.

In step S506, the retransmission request transmitting unit 14 of the assist controller apparatus 10 transmits a retransmission request of the packet to the relay mobile terminal MT#13 managed as the current location of the packet, based on packet location information managed by the packet location information managing unit 12.

In step S507, the retransmission request receiving unit 39 of the relay mobile terminal MT#13 searches through the buffer 34 according to the received retransmission request, and determines that the packet related to the retransmission request has been deleted, and returns, to the assist controller apparatus 10, a response (NG) showing that the packet cannot be transmitted.

In step S508, the retransmission request transmitting unit 14 of the assist controller apparatus 10 transmits a retransmission request of the packet to the forwarding source mobile terminal MT#12 which forwarded the packet to the relay mobile terminal MT#13, based on the packet location information managed by the packet location information managing unit 12.

In step S509, the retransmission request receiving unit 39 of the relay mobile terminal MT#12 searches through the buffer 34, according to the received retransmission request, and determines that the packet related to the retransmission request is held, and returns, to the assist controller apparatus 10, a response (OK) showing that the packet can be transmitted.

In step S510, the packet transmitting unit 35 of the relay mobile terminal MT#12 retransmits the packet addressed to the destination mobile terminal MT#22 held in the buffer 34 to the relay mobile terminal MT#13, in accordance with the retransmission request received by the retransmission request receiving unit 39.

In steps S511 and S512, the packet retransmitted by the relay mobile terminal MT#12 is forwarded to the destination mobile terminal MT#22 through the relay mobile terminals MT#13 and MT#21.

Figure 10:
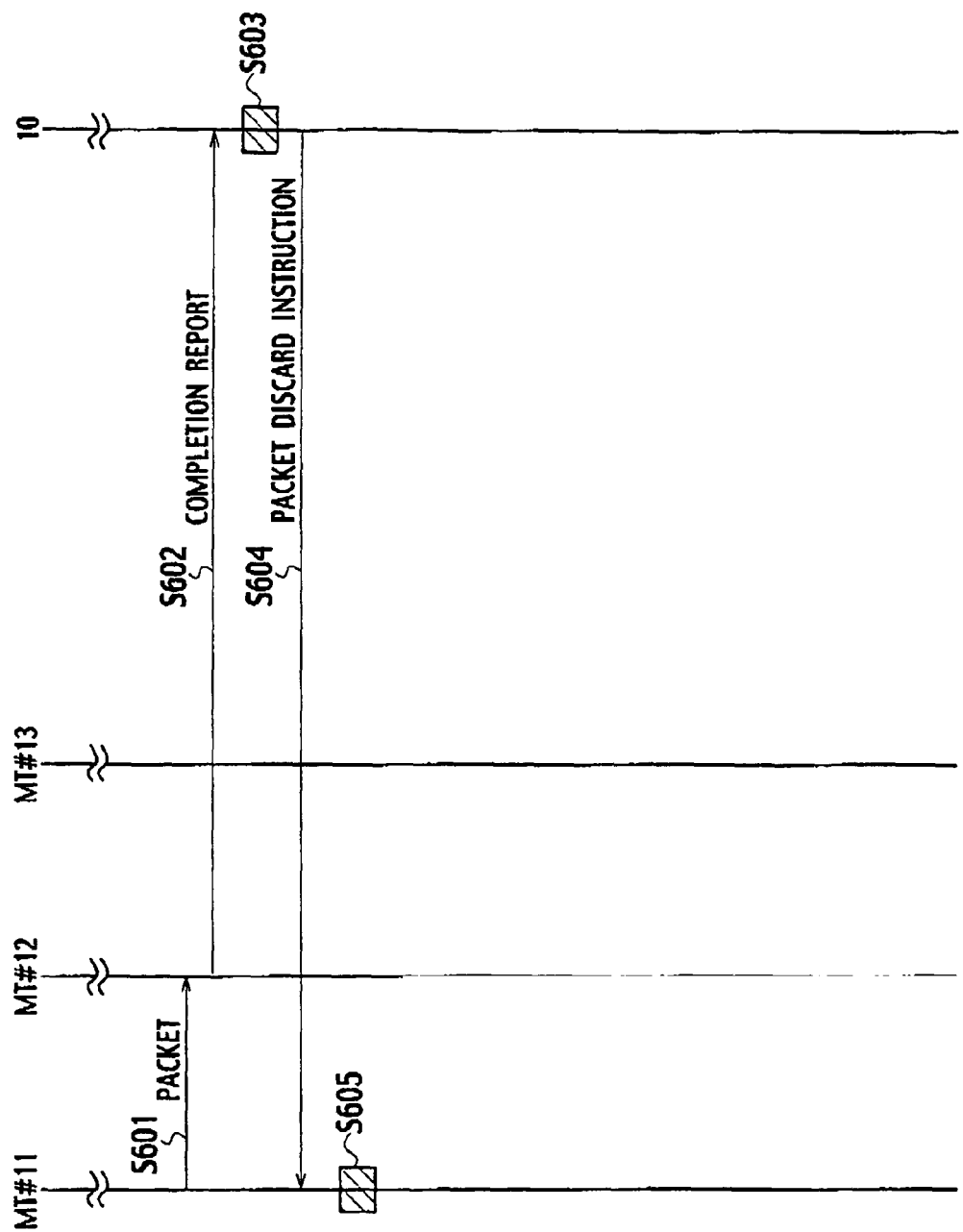
FIG. 10 is a sequence diagram showing an example of operation of discarding a packet in the mobile communication system according to the first embodiment of the present invention.

Sixth, with reference to FIG. 10, an example of operation in which the assist controller apparatus 10 instructs the source mobile terminal MT#11 to discard a packet will be described.

In step S601, the packet transmitting unit 35 of the source mobile terminal MT#11 generates a packet addressed to the destination mobile terminal MT#13 and transmits the packet to the relay mobile terminal MT#12.

In step S602, the completion report transmitting unit 36 of the relay mobile terminal MT#12 transmits, to the assist controller apparatus 10, a completion report showing completion of transmission of the packet from the source mobile terminal MT#11 to the relay mobile terminal MT#12.

In step S603, the packet location information managing unit 12 of the assist controller apparatus 10 updates packet location information on the packet, based on the completion report received by the completion report receiving unit 11. That is, the packet location information managing unit 12 makes the packet location information on the packet reflect the fact that the packet has currently been transmitted to the relay mobile terminal MT#12.

In step S604, the packet discard instructing unit 15 of the assist controller apparatus 10 transmits a packet discard instruction for instructing discard of the packet to the source mobile terminal MT#11.

In step S605, the packet discarding unit 40 of the source mobile terminal MT#11 discards the packet held in the buffer 34, according to the received packet discard instruction.

Effects of the Mobile Communication System in the First Embodiment of the Invention According to the mobile communication system of this embodiment, the assist controller apparatus 10 can control transmission of a packet in an ad hoc network, using packet location information it manages.

Second Embodiment of the Invention

Figure 11:
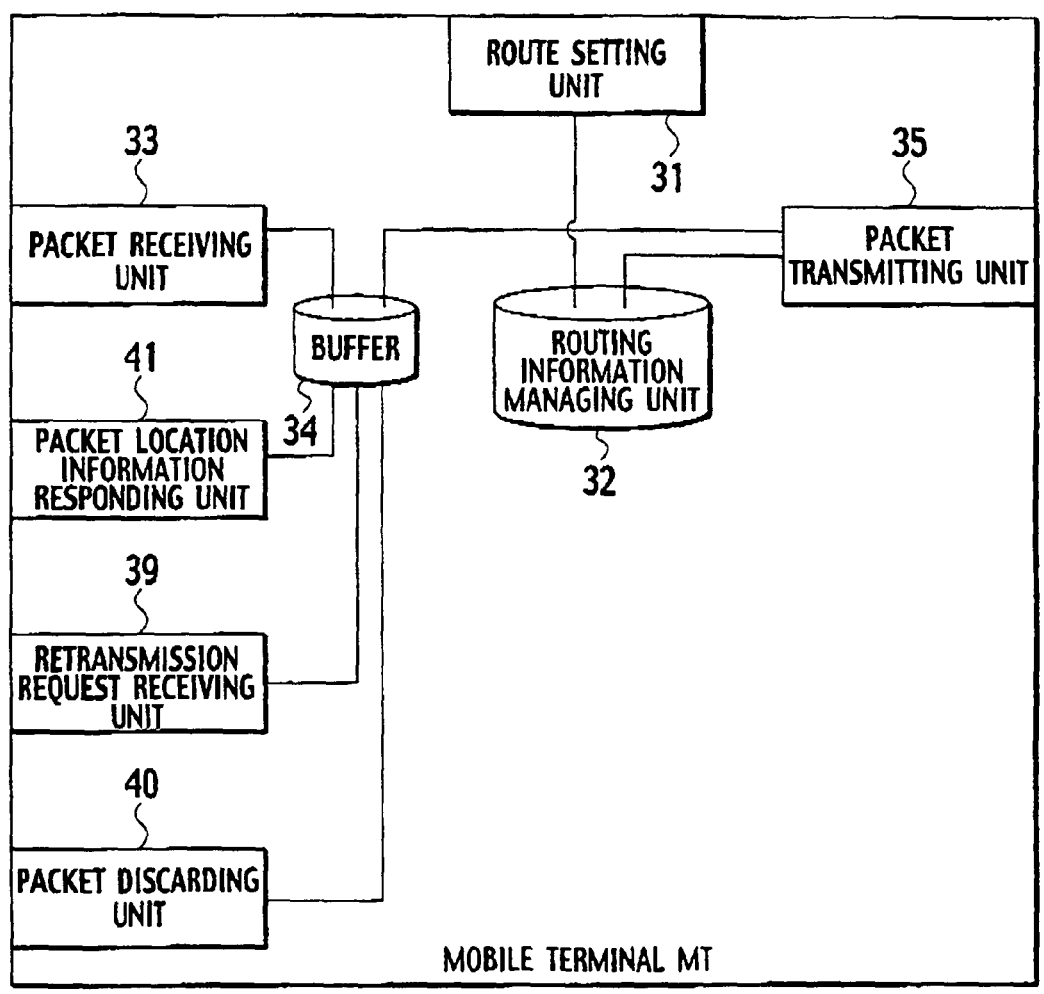
FIG. 11 is a functional block diagram of a mobile terminal in a mobile communication system according to a second embodiment of the present invention.
Figure 12:
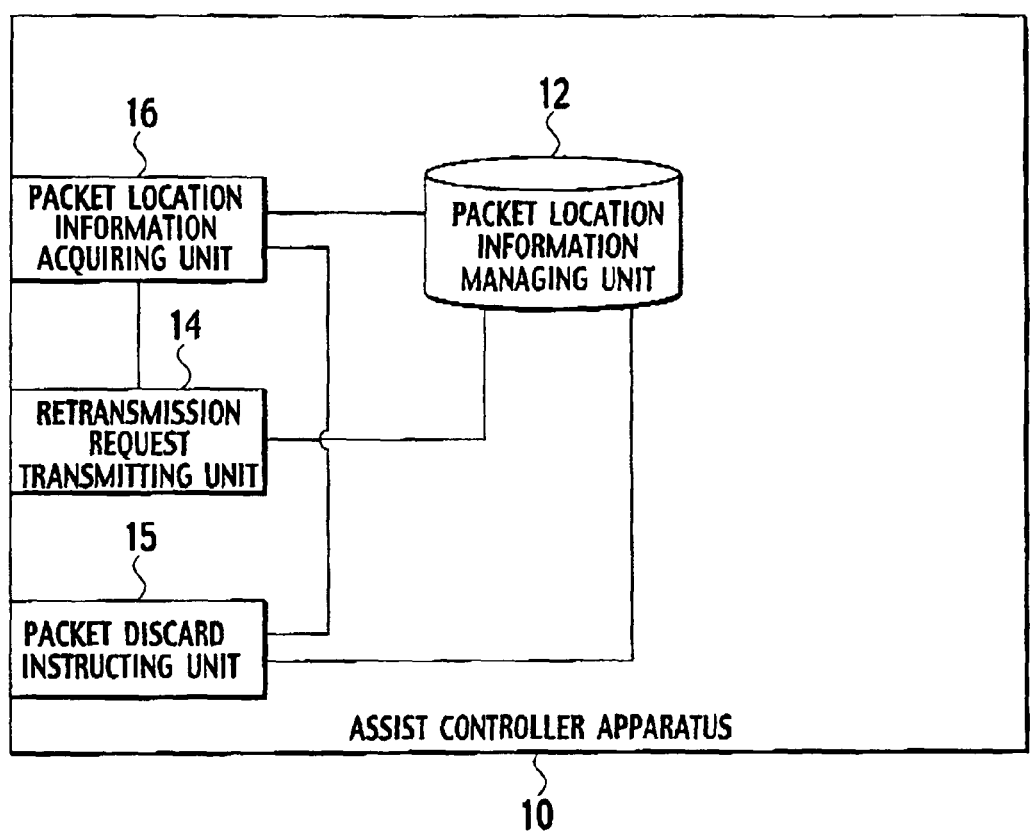
FIG. 12 is a functional block diagram of an assist controller apparatus in the mobile communication system according to the second embodiment of the present invention.
Figure 13:
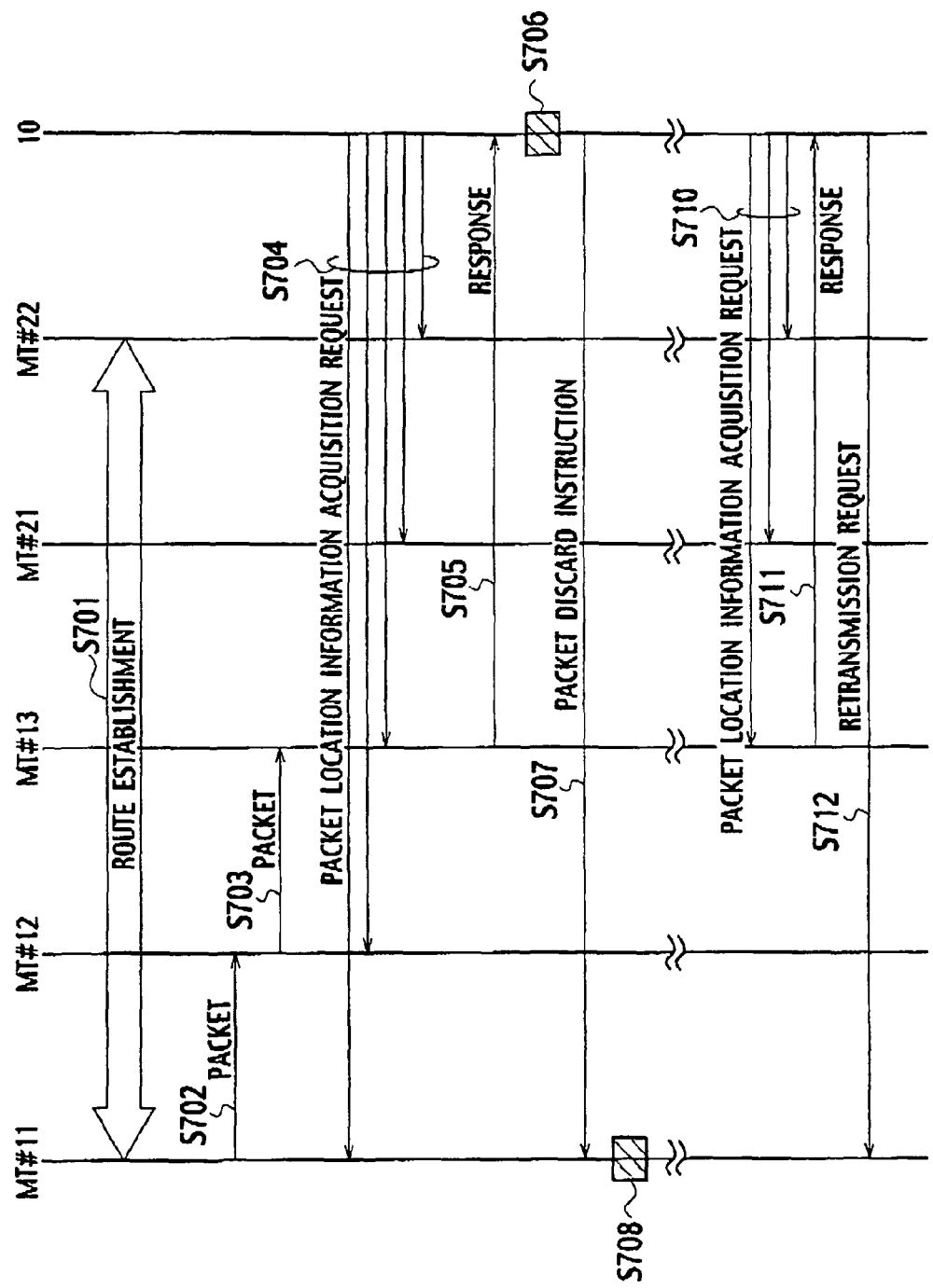
FIG. 13 is a sequence diagram showing an example of packet communication in the mobile communication system according to the second embodiment of the present invention.

With reference to FIGS. 11 to 13, a mobile communication system according to a second embodiment of the present invention will be described.

Hereinafter, differences of the mobile communication system according to the second embodiment of the present invention from the mobile communication system of the above-described first embodiment will be mainly described.

As shown in FIG. 11, a mobile terminal MT of this embodiment includes a route setting unit 31, a routing information managing unit 32, a packet receiving unit 33, a buffer 34, a packet transmitting unit 35, a retransmission request receiving unit 39, a packet discarding unit 40, and a packet location information responding unit 41.

The packet location information responding unit 41 is configured to search through the buffer 34, according to a packet location information acquisition request from an assist controller apparatus 10, to determine whether a packet related to the packet location information acquisition request is held in the buffer 34 or not, and to respond to the assist controller apparatus 10 with the result of the determination.

For example, only when a packet related to a packet location information acquisition request is held in the buffer 34, the packet location information responding unit 41 may be configured to transmit packet location information on the packet to the assist controller apparatus 10.

On the other hand, when a packet related to a packet location information acquisition request is not held in the buffer 34, the packet location information responding unit 41 may be configured to transmit a response showing that fact to the assist controller apparatus 10.

The mobile terminal MT of this embodiment is also configured to respond to a packet location information acquisition request from the assist controller apparatus 10, when a packet has been transmitted from a forwarding source mobile terminal to a forwarding destination mobile terminal, instead of transmitting a completion report showing that fact.

As shown in FIG. 12, the assist controller apparatus 10 of this embodiment includes a packet location information managing unit 12, a retransmission request transmitting unit 14, a packet discard instructing unit 15, and a packet location information acquiring unit 16.

The packet location information acquiring unit 16 is configured to acquire packet location information on a certain packet from a certain mobile terminal at a predetermined timing for updating packet location information managed by the packet location information managing unit 12.

The retransmission request transmitting unit 14 is configured to transmit a retransmission request of a packet to an appropriate mobile terminal when it detects the loss of the packet based on packet location information acquired by the packet location information acquiring unit 16.

With reference to FIG. 13, an example of operation in which a source mobile terminal MT#11 retransmits a packet to a destination mobile terminal MT#22 in the mobile communication system of this embodiment will be described.

In step S701, the route setting unit 31 of the source mobile terminal MT#11 establishes a packet transmission route with the destination mobile terminal MT#22 through relay mobile terminals MT#12, MT#13 and MT#21, and stores routing information on the packet transmission route in the routing information managing unit 32.

In step S702, the packet transmitting unit 35 of the source mobile terminal MT#11 generates a packet addressed to the destination mobile terminal MT#22, and transmits the packet to the relay mobile terminal MT#12.

In step S703, the packet transmitting unit 35 of the relay mobile terminal MT#12 transmits the packet transmitted from the forwarding source mobile terminal MT#11 to the forwarding destination mobile terminal MT#13.

In steps S702 and S703, unlike in the above-described first embodiment, the source mobile terminal MT#11 or the relay mobile terminal MT#12 does not transmit, to the assist controller apparatus 10, a completion report showing completion of transmission (or reception) of the packet.

In step S704, the packet location information acquiring unit 16 of the assist controller apparatus 10 transmits, to the certain mobile terminals MT#11, MT#12, MT#13, MT#21 and MT#22, at a predetermined timing, a packet location information acquisition request for requesting transmission of packet location information on the certain packet for updating packet location information managed by the packet location information managing unit 12.

In step S705, the packet location information responding unit 41 of the relay mobile terminal MT#13 returns, to the assist controller apparatus 10, a response showing that the packet is currently located at the relay mobile terminal MT#13 (packet location information).

In step S706, the packet location information managing unit 12 of the assist controller apparatus 10 updates the packet location information on the packet, based on the packet location information received by the packet location information acquiring unit 16.

That is, the packet location information managing unit 12 makes the packet location information on the packet reflect the fact that the packet has currently been transmitted to the relay mobile terminal MT#13.

In step S707, the packet discard instructing unit 15 of the assist controller apparatus 10 transmits a packet discard instruction for instructing discard of the packet to the source mobile terminal MT#11.

In step S708, the packet discarding unit 40 of the source mobile terminal MT#11 discards the packet held in the buffer 34, according to the received packet discard instruction.

In step S710, the packet location information acquiring unit 16 of the assist controller apparatus 10 transmits, to the certain mobile terminals MT#13, MT#21 and MT#22, at a predetermined timing, a packet location information acquisition request for requesting transmission of packet location information on a certain packet for updating packet location information managed by the packet location information managing unit 12.

In step S711, the packet location information responding unit 41 of the relay mobile terminal MT#13 returns, to the assist controller apparatus 10, a response showing the loss of the packet (loss report).

In step S712, the retransmission request transmitting unit 14 of the assist controller apparatus 10 transmits a retransmission request of the packet to the source mobile terminal MT#11 of the lost packet.

Third Embodiment of the Invention

Figure 14:
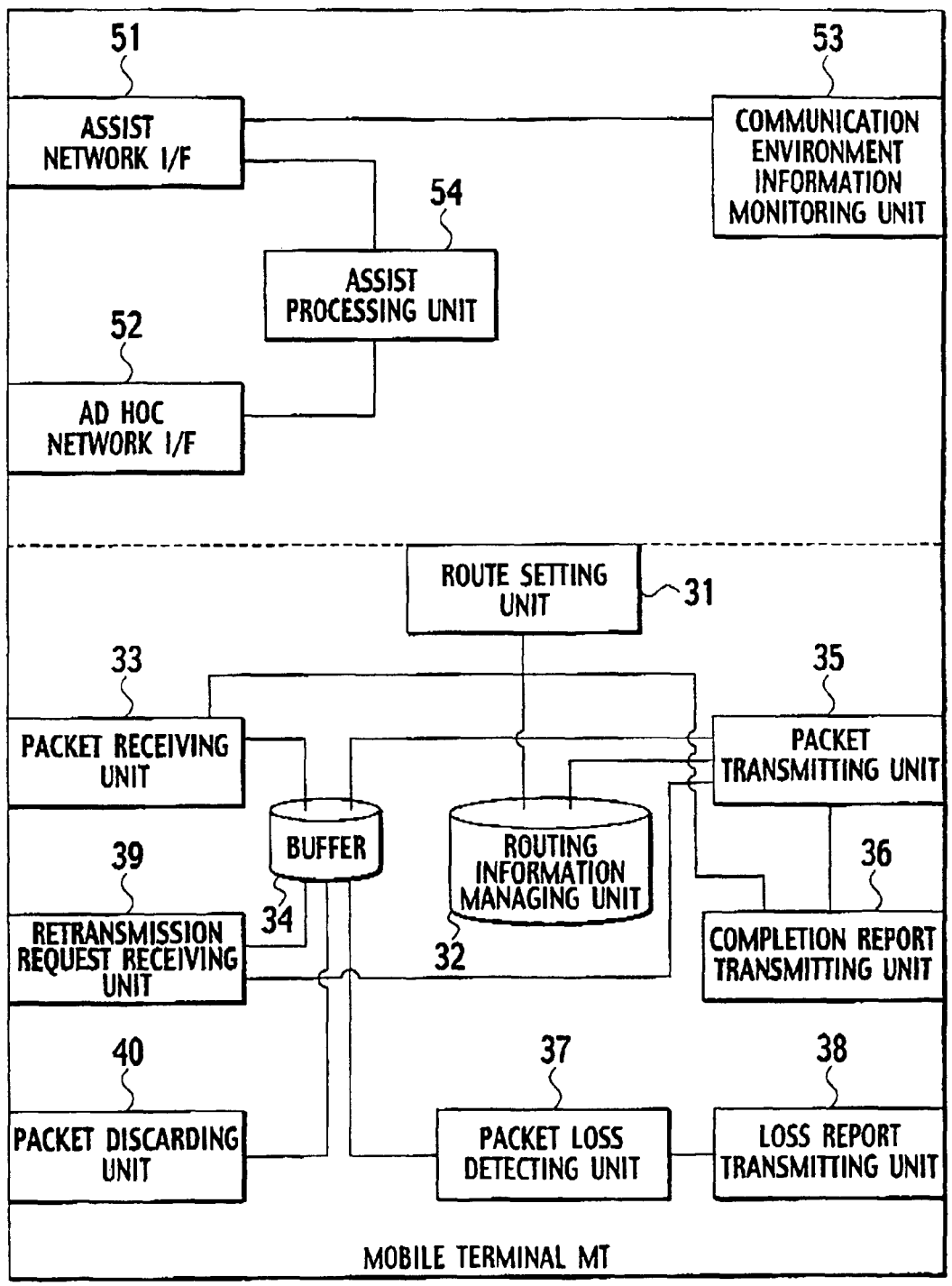
FIG. 14 is-a functional block diagram of a mobile terminal in a mobile communication system according to a third embodiment of the present invention.
Figure 15:
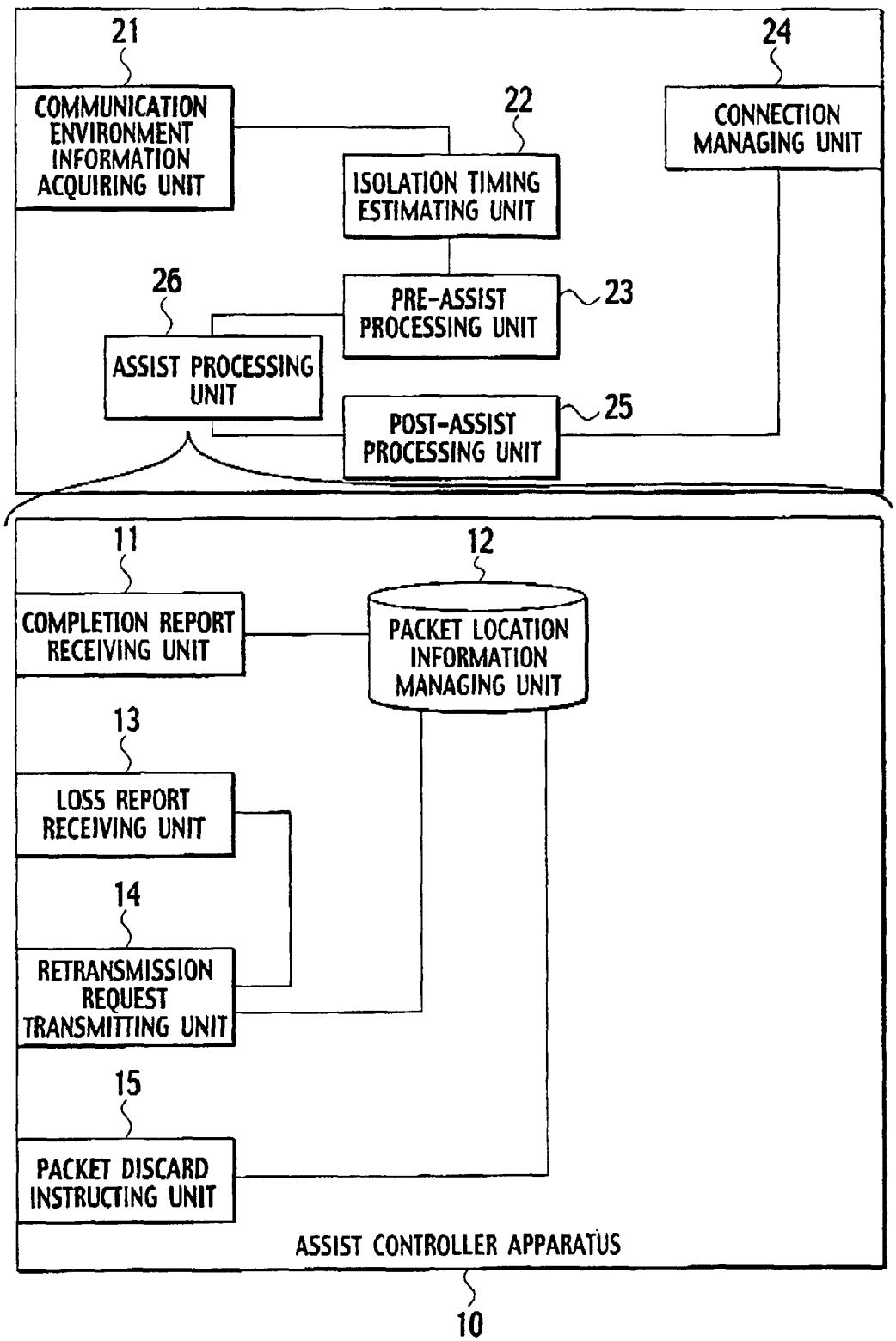
FIG. 15 is a functional block diagram of an assist controller apparatus in the mobile communication system according to the third embodiment of the present invention.
Figure 16:
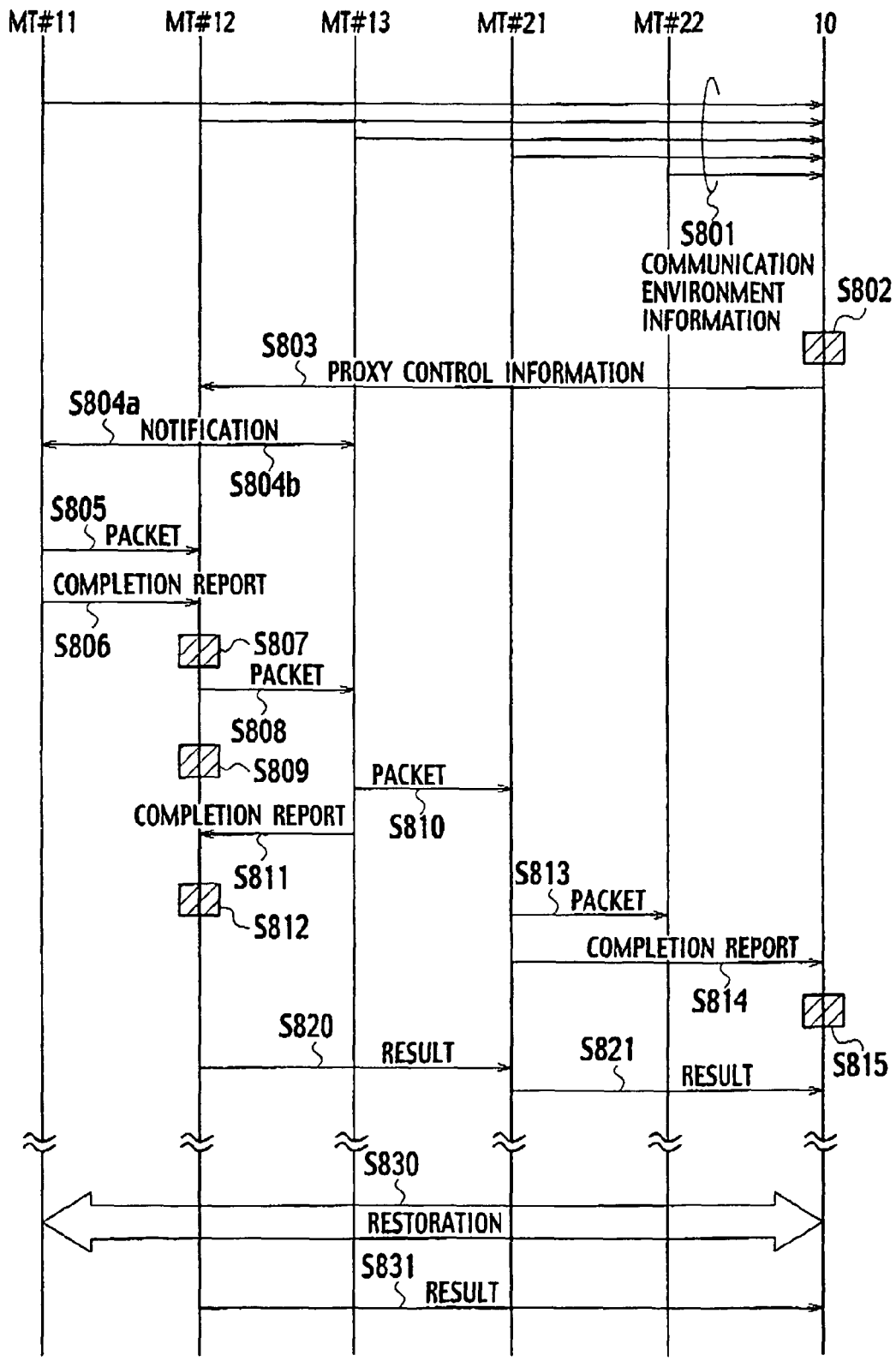
FIG. 16 is a sequence diagram showing an example of packet communication in the mobile communication system according to the third embodiment of the present invention.

With reference to FIGS. 14 to 16, a mobile communication system according to a third embodiment of the present invention will be described.

Hereinafter, differences of the mobile communication system according to the third embodiment of the present invention from the mobile communication system of the above-described first embodiment will be mainly described.

In this embodiment, the configuration of a mobile terminal MT (e.g., mobile terminal #12), among mobile terminals MT belonging to an ad hoc network, which can control transmission of a packet in the ad hoc network, in place of an assist controller apparatus 10 in a situation where connections between the mobile terminals MT and the assist network 10 are cut, will be described.

As shown in FIG. 14, the mobile terminal MT includes, in addition to the components shown in FIG. 2, an assist network interface (I/F) 51, an ad hoc network interface (I/F) 52, a communication environment information monitoring unit 53, and an assist processing unit 54.

The assist network interface 51 is configured to serve as an interface with an assist network.

For example, the assist network interface 51 is configured to transmit, to the assist controller apparatus 10, at a predetermined timing, communication environment information showing a communication environment at the mobile terminal MT generated by the communication environment information monitoring unit 53.

The assist network interface 51 is also configured to receive proxy control information (to be described below) from the assist controller apparatus 10, and to forward the received proxy control information to the assist processing unit 54.

The assist network interface 51 is also configured to manage the connection between the mobile terminal MT and the assist controller apparatus 10, and when the connection is cut or when it determines that the connection will be cut soon, to notify the assist processing unit 54 of that fact.

The ad hoc network interface 52 is configured to serve as an interface with the ad hoc network.

The ad hoc network interface 52 is configured to perform direct communication with other mobile terminals MT belonging to the ad hoc network, thereby transmitting and receiving certain information.

During a period in which the assist processing unit 54 controls transmission of a packet in the ad hoc network, in place of an assist processing unit 26 (to be described below) of the assist controller apparatus 10, for example, the ad hoc network interface 52 is configured to acquire a completion report on transmission of the packet from the other mobile terminals MT belonging to the ad hoc network, and to transmit a retransmission request and a packet discard instruction to the other mobile terminals MT.

The communication environment information monitoring unit 53 is configured to monitor a communication environment at the mobile terminal MT, thereby to generate communication environment information.

For example, the communication environment information monitoring unit 53 is configured to generate communication environment information showing radio wave conditions at the mobile terminal MT (such as the reception power, the reception SIR or the reception CIR at the mobile terminal MT).

The communication environment information monitoring unit 53 may be alternatively configured to generate communication environment information including information other than radio wave conditions if the information shows a communication environment at the mobile terminal MT.

The assist processing unit 54 is configured to control transmission of a packet at the other mobile terminals MT belonging to the ad hoc network, in place of the assist processing unit 26 of the assist controller apparatus 10, based on proxy control information received through the assist network interface 51, when the connection between the mobile terminal MT and the assist controller apparatus 10 is cut, at the latest.

That is, in that case, the assist processing unit 54 implements the functions of a completion report receiving unit 11, a packet location information managing unit 12, a loss report receiving unit 13, a retransmission request transmitting unit 14 and a packet discard instructing unit 15 (see FIG. 3).

The assist processing unit 54 only needs to be configured to perform the above-described packet transmission control when the connection is cut, at the latest, and may perform the above-described packet transmission control after a lapse of a predetermined period since reception of the above-descried proxy control information.

Also, when the connection between the mobile terminal MT and the assist controller apparatus 10 is restored, the assist processing unit 54 is configured to transmit a result of the packet transmission control (such as packet location information) it has performed in place of the assist processing unit 26 of the assist controller apparatus 10, to the assist controller apparatus 10 through the assist network interface 51.

As shown in FIG. 15, the assist controller apparatus 10 according to this embodiment includes a communication environment information acquiring unit 21, an isolation timing estimating unit 22, a pre-assist processing unit 23, a connection managing unit 24, a post-assist processing unit 25, and the assist processing unit 26.

The communication environment information acquiring unit 21 is configured to acquire, from the mobile terminals MT#11 to MT#22 belonging to ad hoc networks, communication environment information showing communication environments at the mobile terminals MT#11 to MT#22.

The communication environment information acquiring unit 21 is configured to acquire radio wave conditions at the mobile terminals MT as communication environment information.

The radio wave conditions may be the reception power, the reception SIR or the reception CIR at the mobile terminals MT.

The communication environment information acquiring unit 21 may be configured to acquire information other than radio wave conditions as communication environment information if the information shows communication environments at the mobile terminals MT.

The communication environment information acquiring unit 21 may be configured to wait transmission of communication environment information from the mobile terminals MT for acquisition, or may be configured to transmit a communication environment information acquisition request to the mobile terminals MT at a predetermined timing to acquire communication environment information.

The isolation timing estimating unit 22 is configured to determine whether acquired communication environment information satisfies a predetermined condition or not.

Specifically, when acquired communication environment information satisfies the predetermined condition, the isolation timing estimating unit 22 is configured to estimate that the connections between the assist controller apparatus 10 and the mobile terminals MT will be cut soon (that is, the ad hoc network formed by the mobile terminals MT will be isolated soon).

For example, when the average of the reception power, the reception SIR or the reception CIR at the mobile terminals is less than or equal to a predetermined threshold, the isolation timing estimating unit 22 is configured to determine that acquired communication environment information satisfies a predetermined condition.

Alternatively, the isolation timing estimating unit 22 may be configured to prepare several predetermined conditions, and to estimate the timing of isolation of the ad hoc network formed by the mobile terminals MT based on a predetermined condition which acquired communication environment information satisfies.

For example, when the average of the reception power, the reception SIR or the reception CIR at the mobile terminals MT is less than or equal to a first threshold, the isolation timing estimating unit 22 is configured to estimate that the connections between the assist controller apparatus 10 and the mobile terminals MT will be cut in ten seconds (that is, the isolation timing is in ten seconds).

On the other hand, when the average of the reception power, the r reception SIR or the reception CIR at the mobile terminals MT is less than or equal to a second threshold (first threshold>second threshold), the isolation timing estimating unit 22 is configured to estimate that the connections between the assist controller apparatus 10 and the mobile terminals MT will be cut in one second (that is, the isolation timing is in one second).

The pre-assist processing unit 23 is configured to instruct a certain mobile terminal (e.g., MT#12) belonging to an ad hoc network to control transmission of a packet in the ad hoc network, in place of the assist processing unit 26, based on a result of determination by the isolation timing estimating unit 22.

Specifically, the pre-assist processing unit 23 is configured to transmit proxy control information for controlling transmission of a packet in the ad hoc network in place of the assist processing unit 26 of the assist controller apparatus 10, to the certain mobile terminal belonging to the ad hoc network.

The proxy control information includes, for example, an estimation that the connections between the assist controller apparatus 10 and the mobile terminals MT will be cut soon (that is, the ad hoc network formed by the mobile terminals MT will be isolated soon), an isolation timing, and a program and data (such as packet location information) required for controlling packet transmission in the ad hoc network.

The pre-assist processing unit 23 may be configured to adjust the timing of transmission of the above-described proxy control information, based on an isolation timing estimated by the isolation timing estimating unit 22.

The pre-assist processing unit 23 may be alternatively configured to transmit the above-described proxy control information to a plurality of mobile terminals instead of transmitting the above-described proxy control information to one mobile terminal, thereby instructing them to perform packet transmission control in place of the assist processing unit 26.

The connection managing unit 24 is configured to manage the connections between mobile terminals MT forming an ad hoc network and the assist controller apparatus 10.

When the connection managing unit 24 detects restoration of the connections, it is configured to notify the post-assist processing unit 25 of that fact.

The post-assist processing unit 125 is configured to perform post-processing on packet transmission control performed by a certain mobile terminal, in place of the assist processing unit 26 of the assist controller apparatus 10, when the connections between mobile terminals MT belonging to an ad hoc network and the assist controller apparatus 10 are restored.

Specifically, the post-assist processing unit 25 is configured to receive a result of packet transmission control performed by a certain mobile terminal (e.g., mobile terminal MT#12) in place of the assist processing unit 26 of the assist controller apparatus 10, when the connections between mobile terminals MT belonging to an ad hoc network and the assist controller apparatus 10 are restored.

Then, the post-assist processing unit 25 is configured to perform processing, based on the received control result, for the assist processing unit 26 to resume packet transmission control in the ad hoc network.

For example, the post-assist processing unit 25 is configured to inherit packet location information in an ad hoc network as a control result from a certain mobile terminal.

The assist processing unit 26 is configured to control transmission of a packet in an ad hoc network. That is, the assist processing unit 26 is configured to implement the functions of a completion report receiving unit 11, a packet location information managing unit 12, a loss report receiving unit 13, a retransmission request transmitting unit 14 and a packet discard instructing unit 15 (see FIG. 3).

With reference to FIG. 16, an example of operation in the mobile communication system according to this embodiment will be described, in which transmission of a packet from the source mobile terminal MT#11 to the destination mobile terminal MT#22 in ad hoc networks is changed from the state of being controlled by the assist controller apparatus 10 to the state of being autonomously controlled by the certain mobile terminal #12.

As shown in FIG. 16, in step S801, the connections between the assist controller apparatus 10 and mobile terminals MT#11, MT#12, MT#13, MT#21 and MT#22 are established.

The mobile terminals MT#11, MT#12, MT#13, MT#21 and MT#22 transmit communication environment information to the assist controller apparatus 10 at a predetermined timing.

In step S802, the isolation timing estimating unit 22 of the assist controller apparatus 10 estimates that the connections between the assist controller apparatus 10 and the mobile terminals MT#11, MT#12 and MT#13 will be cut soon (that is, an ad hoc network #1 formed by the mobile terminals MT#11, MT#12 and MT#13 will be isolated soon), because the communication environment information satisfies a predetermined condition.

In step S803, the pre-assist processing unit 23 of the assist controller apparatus 10 transmits proxy control information to the certain mobile terminal MT#12.

In steps S804a and S804b, based on the received proxy control information, the mobile terminal MT#12 notifies the mobile terminals MT#11 and MT#13 that it controls packet transmission in the ad hoc network #1.

In step S805, the packet transmitting unit 35 of the source mobile terminal MT#11 generates a packet addressed to the destination mobile terminal MT#22 and transmits the packet to the mobile terminal MT#12.

In step S806, the completion report transmitting unit 36 of the source mobile terminal MT#11 transmits a completion report showing completion of transmission of the packet from the forwarding source mobile terminal MT#11 to the forwarding destination mobile terminal MT#12, to the mobile terminal MT#12 which controls transmission of a packet in place of the assist controller apparatus 10.

In step S807, the assist processing unit 54 of the mobile terminal MT#12 updates packet location information on the packet, based on the received completion report.

That is, the assist processing unit 54 makes the packet location information on the packet reflect the fact that the packet has currently been transmitted to the mobile terminal MT#12.

In step S808, the packet transmitting unit 35 of the mobile terminal MT#12 transmits the packet transmitted from the forwarding source mobile terminal (source mobile terminal) MT#11 to the forwarding destination mobile terminal MT#13.

In step S809, the assist processing unit 54 of the mobile terminal MT#12 makes the packet location information on the packet reflect the fact that the transmission of the packet from the mobile terminal MT#12 to the mobile terminal MT#13 has been completed.

In step S810, the packet transmitting unit 35 of the mobile terminal MT#13 transmits the packet transmitted from the forwarding source mobile terminal MT#12 to the forwarding destination mobile terminal MT#21.

In step S811, the completion report transmitting unit 36 of the mobile terminal MT#13 transmits, to the mobile terminal MT#12, a completion report showing completion of transmission of the packet from the forwarding source mobile terminal MT#12 to the forwarding destination mobile terminal MT#21.

In step S812, the assist processing unit 54 of the mobile terminal MT#12 updates the packet location information on the packet, based on the received completion report.

That is, the assist processing unit 54 makes the packet location information on the packet reflect the fact that the packet has currently been transmitted to the mobile terminal MT#21.

In step S813, the packet transmitting unit 35 of the mobile terminal MT#21 transmits the packet transmitted from the forwarding source mobile terminal MT#13 to the forwarding destination mobile terminal (destination mobile terminal) MT#22.

In step S814, the completion report transmitting unit 36 of the mobile terminal MT#21 transmits, to the assist controller apparatus 10, a completion report showing completion of transmission of the packet from the forwarding source mobile terminal MT#13 to the forwarding destination mobile terminal MT#22.

In step S615, the assist processing unit 26 (packet location information managing unit 12) of the assist controller apparatus 10 makes packet location information on the packet reflect the fact that the transmission of the packet from the mobile terminal MT#21 to the mobile terminal MT#22 has been completed.

Since the connection between an ad hoc network #2 and the assist controller apparatus 10 has been established, in steps S820 and S821, the assist processing unit 54 of the mobile terminal MT#12 may transmit a result of transmission control of the packet to the assist controller apparatus 10 through the mobile terminal MT#21.

In step S830, when the connections between the mobile terminals MT#11, MT#12 and MT#13 and the assist controller apparatus 10 are restored, n step S830, the mobile terminal MT#12 detects that fact and transmits, to the assist controller apparatus 10, a result of the packet transmission control (such as packet location information) it has performed in place of the assist controller apparatus 10.

In step S831, based on the received control result, the post-assist processing unit 25 of the assist controller apparatus 10 inherits the control state (such as packet location information) during a period of disconnection between the mobile terminals MT#11, MT#12 and MT#13 and the assist controller apparatus 10, and then, the assist processing unit 26 of the assist controller apparatus 10 resumes packet transmission control in the ad hoc network #1.

According to the mobile communication system of the third embodiment of the present invention, even when the predetermined condition is satisfied (e.g., when radio wave conditions between the assist controller apparatus 10 and the mobile terminals MT deteriorate), the pre-assist processing unit 23 of the assist controller apparatus 10 transmits proxy control information to the certain mobile terminal MT#12, whereby the certain mobile terminal MT#12 can control transmission of a packet in the ad hoc network #1 in place of the assist controller apparatus 10, using the proxy control information transmitted from the assist controller apparatus 10.

Also, according to the mobile communication system of the third embodiment of the present invention, the assist controller apparatus 10 can quickly and easily resume packet transmission control in the ad hoc network #1, using a result of control (such as packet location information) by the certain mobile terminal MT#12.

Additional advantages and modifications will readily occur to those skilled in the art. Therefore, the invention in its broader aspects is not limited to the specific details and the representative embodiments shown and described herein. Accordingly, various modifications may be made without departing from the scope of the general inventive concept as defined by the appended claims and their equivalents.

What is claimed is:

1. A controller apparatus configured to control transmission of a packet from a source mobile terminal to a destination mobile terminal through a plurality of relay mobile terminals in an ad hoc network formed by a plurality of mobile terminals, each mobile terminal having a loss report transmitting unit, the control apparatus being distinct from the source and destination mobile terminals, the controller apparatus comprising:
    a packet location information managing unit configured to manage packet location information showing to which mobile terminal the packet has been transmitted in the ad hoc network, the packet location information associating packet identification information to identify the packet with mobile terminal identification information, by receiving completion reports that include the packet location information directly from any one of the source mobile terminal, the destination mobile terminal, and the one or more relay mobile terminals that has either sent or received the packet, and the completion reports are not relayed through any other mobile terminal;
    a detecting unit configured to detect loss of the packet in one of the mobile terminals of the ad hoc network, the detecting unit configured to receive a loss report from the loss report transmitting unit that is configured to detect a local loss in the corresponding mobile terminal that lost the packet; and
    a retransmission request transmitting unit configured to transmit a retransmission request for the lost packet to one of the relay mobile terminals that is managed as a current location of the packet, based on packet location information managed by the packet location information managing unit,
    wherein the retransmission request unit transmits the retransmission request for the lost packet to a relay mobile terminal that is located one hop before the relay mobile terminal that sent the loss report, in a case where the relay mobile terminal that sent the loss report cannot find the packet in a buffer.

2. The controller apparatus as set forth in claim 1 further comprising:
    a completion report acquiring unit configured to acquire, from the relay mobile terminals, a completion report showing completion of forwarding of the packet;
    wherein the packet location information managing unit is configured to update the packet location information according to the completion report.

3. The controller apparatus as set forth in claim 1 further comprising:
    a checking unit configured to check with the relay mobile terminals whether the relay mobile terminals hold the packet or not;
    wherein the packet location information managing unit is configured to update the packet location information based on a result of the checking.

4. The controller apparatus as set forth in claim 1 further comprising:
    a checking unit configured to check with the relay mobile terminals whether the relay mobile terminals hold the packet or not;
    wherein the retransmission request transmitting unit is configured to transmit the retransmission request to a relay mobile terminal holding the packet, based on a result of the checking.

5. The controller apparatus as set forth in claim 1 further comprising:
    a communication environment information acquiring unit configured to acquire, from the mobile terminals, communication environment information showing a communication environment at the mobile terminals; and
    a proxy control information transmitting unit configured to transmit proxy control information for performing transmission control of the packet in place of the controller apparatus, to a certain mobile terminal belonging to the ad hoc network when the acquired communication environment information satisfies a predetermined condition.

6. The controller apparatus as set forth in claim 1, wherein the controller apparatus is arranged in a star configuration towards the source mobile terminal, the destination mobile terminal, and the one or more relay mobile terminals to receive the completion reports.

7. A communication control method for controlling transmission of a packet from a source mobile terminal to a destination mobile terminal through a plurality of relay mobile terminals in an ad hoc network formed by a plurality of mobile terminals, each mobile terminal having a loss report transmitting unit, the controlling being performed by an external control apparatus being distinct from the source and destination mobile terminals, the method comprising:
    forwarding, at each of the relay mobile terminals, the packet received from a forwarding source mobile terminal to a forwarding destination mobile terminal;
    transmitting, at each of the relay mobile terminals, a completion report showing completion of forwarding of the packet to an adjacent mobile terminal in the ad hoc network, directly to the external controller apparatus configured to control transmission of the packet in the ad hoc network without relaying the completion report through any other mobile terminal, the completion report including packet location information, the packet location information associating packet identification information to identify the packet with mobile terminal identification information; and
    managing, at the external controller apparatus, the packet location information showing to which mobile terminal the packet has been transmitted in the ad hoc network, according to the completion report;
    detecting a loss of the packet in one of the mobile terminals of the ad hoc network by a detecting unit arranged at the external control apparatus, said step of detecting is performed by receiving a loss report from the loss report transmitting unit that is configured to detect a local loss in a corresponding mobile terminal that lost the packet; and retransmitting a retransmission request for the lost packet to one of the relay mobile terminals that is managed as a current location of the packet, based on packet location information according to the completion report from said step of transmitting, and transmitting the retransmission request for the lost packet to a relay mobile terminal that is located one hop before the relay mobile terminal that sent the loss report, in a case where the relay mobile terminal that sent the loss report cannot find the packet in a buffer.

8. A communication control method for controlling transmission of a packet from a source mobile terminal to a destination mobile terminal through one or more relay mobile terminals in an ad hoc network formed by a plurality of mobile terminals, each mobile terminal having a loss report transmitting unit, the controlling being performed by an external control apparatus being distinct from the source and destination mobile terminals, the method comprising:

forwarding, at each of the relay mobile terminals, the packet received from a forwarding source mobile terminal to a forwarding destination mobile terminal;

checking, at the external controller apparatus configured to control transmission of the packet in the ad hoc network, with each of the relay mobile terminals whether the relay mobile terminal holds the packet or not by sending a request;

transmitting, from each of the relay mobile terminals, a result of the checking to the external controller apparatus, the result of the checking including information that indicates whether the respective relay mobile terminal holds the packet or not, and mobile terminal identification information, the result of the checking is transmitted to the external controller apparatus without relaying the result of checking by any of the mobile terminals;

managing, at the external controller apparatus, packet location information showing to which mobile terminal the packet has been transmitted in the ad hoc network, the packet location information associating packet identification information to identify the packet with mobile terminal identification information, according to the result of the checking;

detecting a loss of the packet in one of the mobile terminals of the ad hoc network by the external control apparatus, the step of detecting receiving a loss report from the loss report transmitting unit that is configured to detect a local loss in a corresponding mobile terminal that lost the packet; and retransmitting a retransmission request for the lost packet to one of the relay mobile terminals that is managed as a current location of the packet, based on packet location information according to the result of said checking, and transmitting the retransmission request for the lost packet to a relay mobile terminal that is located one hop before the relay mobile terminal that sent the loss report, in a case where the relay mobile terminal that sent the loss report cannot find the packet in a buffer.

* * * * *